(12) United States Patent
Jiang

(10) Patent No.: US 8,761,760 B2
(45) Date of Patent: Jun. 24, 2014

(54) METHOD AND SYSTEM FOR PROVIDING PIGGYBACK ROAMING FOR SPONSORING SPLIT ROAMING RELATIONSHIPS

(75) Inventor: John Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 202 days.

(21) Appl. No.: 13/486,647

(22) Filed: Jun. 1, 2012

(65) Prior Publication Data

US 2012/0244859 A1  Sep. 27, 2012

Related U.S. Application Data

(63) Continuation of application No. 12/593,596, filed as application No. PCT/US2008/003966 on Mar. 27, 2008, now Pat. No. 8,254,918.

(60) Provisional application No. 60/907,287, filed on Mar. 27, 2007.

(51) Int. Cl.
*H04W 4/00* (2009.01)

(52) U.S. Cl.
USPC ..................................................... 455/432.1

(58) Field of Classification Search
USPC ................ 455/432.1–433; 370/331, 401, 521
See application file for complete search history.

(56) References Cited

U.S. PATENT DOCUMENTS

| 6,684,073 | B1 | 1/2004 | Joss et al. |
|---|---|---|---|
| 7,072,651 | B2 | 7/2006 | Jiang et al. |
| 7,369,848 | B2 | 5/2008 | Jiang |
| 7,505,769 | B2 | 3/2009 | Jiang |
| 7,577,431 | B2 | 8/2009 | Jiang |
| 7,616,954 | B2 | 11/2009 | Jiang |
| 7,660,580 | B2 | 2/2010 | Jiang |
| 7,743,763 | B2 | 6/2010 | Grip et al. |
| 7,912,464 | B2 | 3/2011 | Jiang |

OTHER PUBLICATIONS

GSM Association Official Document AA.13, Common Annexes 18.3, Apr. 28, 2011, pp. 1-40.
GSM Association Official Document AA.14, international Roaming Agreement—Individual Annexes 18.0, May 2006, pp. 1-61.
GSM Association Official Document AA.19, Addendum to the International GSM Roaming Agreement: SMS interworking Agreement 13.1, Sep. 6, 2010, pp. 1-30.
GSM Association Permanent Reference Document: AA.31, Addendum to the International Roaming Agreement (GPRS and/or 3GSM Roaming Addendum), 3.12—KPN Mobile, Dec. 2002, pp. 1-18.
GSM 902 on MAP Specification Digital Cellular Telecommunications (Phase 2+); Mobile Application Part (MAP) Specification (3GPP TS 09.02 version 7.9.0 Release 1998).

(Continued)

*Primary Examiner* — Joel Ajayi
(74) *Attorney, Agent, or Firm* — Arent Fox LLP

(57) ABSTRACT

A method for facilitating exchange of one or more signaling messages between a client network and an HSRP network. The method includes identifying by an SPRS router associated with a client network, one or more parameters in the received signaling messages so as to determine from the parameters one or more roaming agreements that are required between the client network and the HSRP network, to allow exchange of the signaling messages. The method further includes facilitating by the SPRS router, exchange of the signaling messages between the client network and the HSRP network via one or more SPRS hubs, when the SPRS router determines absence of the required roaming agreements. The method further includes facilitating by the SPRS router, direct exchange of the signaling messages between the client network and the HSRP network, when the SPRS router determines presence of the required roaming agreements.

33 Claims, 14 Drawing Sheets

(56) References Cited

OTHER PUBLICATIONS

GSM 340 on SMS Digital cellular telecommunications system (Phase 2+); Technical realization of the Short Message Service (SMS); (GSM 03.40 version 7.4.0 Release 1998).
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).
3G TS 22.078 version 3.2.0 Release 1999 $3^{rd}$ Generation Partnership Project; Technical Specification Group Services and System Aspects; Customized Applications for Mobile Network Enhanced Logic (CAMEL); Service description, Stage 1.
GSM 978 on CAMEL Application protocoi Digital cellular telecommunications system (Phase 2+); Customized Applications for Mobile network Enhanced Logic (CAMEL); CAMEL Application Part (CAP) specification (GSM 09.78 version 7.1.0 Release 1998).
3G TS 29.002 version 4.8.0 Release 2002 $3^{rd}$ Generation Partnership Project; Technical Specification Group Core Network; Mobile Application Part (MAP) Specification (Release 4).
ETSI TS 101 344 version 7.9.0 Release 2002 Digital Cellular Telecommunications (Phase 2+); General Packet Radio Service (GRRS) Service description; Stage 2 (3GPP TS 03.60 version 7.9.0 Release 1998).
GSM 23060 $3^{rd}$ Generation Partnership Project; Technical Specification Group Services and System Aspects; General Packet Radio Service (GPRS); Service description; Stage 2 (Release 5). 2002.
ETSI TS 101 347 version 7.10.0 Release 2002 Digital Cellular Telecommunications (Phase 2+); General Packet Radio Service (GPRS) GPRS Tunnelling Protocol (GTP) across the Gn and Gp Interface (3GPP TS 09.60 version 7.10.0 Release 1998).
ETSI TS 129 060 version 5.4.0 Relase 2000 Digital Cellular Telecommunications System (Phase 2+); Universal Mobile Telecommunications System (UMTS); General Packet Radio Service (GPRS) GPRS Tunnelling Protocol (GTP) across the Gn and Gp Interface (3GPP TS 29.060 version 5.4.0 Release 5).
ETSI TS 101 045 version 7.3.0 Release 2000 Digital Cellular Telecommunications System (Phase 2+); Support of Optimal Routeing (SOR); Technical realization (GSM 03.79 version 7.3.0 Release 1998).
ETSI TS 101 043 version 6.6.0 Release 2000 Digital Cellular Telecommunications System (Phase 2+); Basic Call Handling; Technical realization (GSM 03.18 version 6.6.0 Release 1997).
ETSI-GSM Technical Specification Digital Cellular Telecommunications System (Phase 1); Security-related Network Functions (GSM 03.20 version 3.3.2), 1992.
3GPP TS 23.012 version 4.0.0 Release 2001 $3^{rd}$ Generation Partnership Project; Technical Specification Group Core Network; Location Management Procedures (Release 4), 2001.
GSM Association Permanent Reference Document: IR.21, GCM Association Roaming Database, Structure and Updating Procedures, version 3.9.4, Aug. 2003, pp. 1-17.
ITU-T Recommendation Q.1214. Intelligent Network, Distributed Functional Plane for Intelligent Network CS-1, 1993.
ITU-T Recommendation Q. 1215, Intelligent Network, Physical Plane for Intelligent Network CS-1, 1993.
ITU-T Recommendation Q.1218, Intelligent Network, Interface Recommendation for Intelligent Network CS-1, 1993.
ITU-T Recommendation Q.701, Specifications of Signalling System No. 7, Functional Description of the Message Transfer Part (MTO) of Signalling System No. 7, 1988.
ITU-T Recommendation Q.702, Specifications of Signalling System No. 7, Signalling Data Link, 1988.
ITU-T Recommendation Q.703, Series Q: Switching and Signalling, Specifications of Signalling System No. 7—Message Transfer Part, Signalling Link, 1988.
ITU-T Recommendation Q.711, Series Q: Switching and Signalling, Specifications of Signalling System No. 7—Signalling Connection Control Part, Functional Description of the Signalling Connection Control Part, 1988.
ITU-T Recommendation Q.712, Series Q: Switching and Signalling, Specifications of Signalling System No. 7—Signalling Connection Control Part, Definition and Function of Signalling Connection Control Part Messages, 1988.
ITU-T Recommendation Q.713, Series Q: Switching and Signalling, Specifications of Signalling System No. 7—Signalling Connection Control Part (SCCP), Signalling Connection Control Part Formats and Codes, 1988.
ITU-T Recommendation Q.714, Series Q: Switching and Signalling, Specifications of Signalling System No. 7—Signalling Connection Control Part, Signalling Connection Control Part Procedures, 1988.
ITU-T Recommendation Q.762, Series Q: Switching and Signalling, Specifications of Signalling System No. 7—ISDN Use Part, Signalling System No. 7—ISDN Use Part General Functions of Messages and Signals, 1988.
ITU-T Recommendation Q.763, Series Q: Switching and Signalling, Specifications of Signalling System No. 7—ISDN User Part, Signailing System No. 7—ISDN User Part Formats and Codes, 1988.
ITU-T Recommendation Q.764, Series Q: Switching and Signalling, Specifications of Signalling System No. 7—ISDN User Part, Signalling System No. 7—ISDN User Part Signalling Procedures, 1988.
ITU-T Recommendation Q.765, Series Q: Switching and Signalling, Specifications of Signalling System No. 7—ISDN User Part, Signalling System No. 7—Application Transport Mechanism, 1988.
ITU-T Recommendation Q.766, Specifications of Signalling System No. 7—ISDN User Part, Performance Objectives in the Integrated Services Digital Network Application, 1988.
ITU-T Recommendation Q.767, Specifications of Signalling System No. 7 Application of the ISDN User Part of CCITT Signalling System No. 7 for International ISDN Interconnections, 1991.
ITU-T Recommendation Q.768, Digital Subscriber Signalling System No. 1, Signalling Interface Between an International Switching Centre (ISC) and an ISDN Satellite Subnetwork, 1995.
ITU-T Recommendation Q.769.1, Series Q: Switching and Signalling, Specifications of Signalling System No. 7—ISDN User Part, Signalling System No. 7—ISDN User Part Enhancements for the Support of Number Portability, 1999.
GSM Association OC Roaming Model, OC#18 Roaming Workshop, Jun. 23, 2006, pp. 1-18.

METHOD AND SYSTEM FOR PROVIDING PIGGYBACK ROAMING FOR SPONSORING SPLIT ROAMING RELATIONSHIPS

RELATED APPLICATIONS

This application is a continuation of U.S. application Ser. No. 12/593,596 titled "Method and System for Providing Piggyback Roaming for Sponsoring Split Roaming Relationship" filed Sep. 28, 2009, which claims priority from U.S. Provisional Patent Application No. 60/907,287 entitled "Piggyback Roaming with a Two-Node Architecture for Sponsoring Split Roaming Relationship", filed on Mar. 27, 2007. This application is also related to U.S. patent application Ser. No. 10/778,861 "Signaling and Packet Relay System Including General Packet Radio Services (GPRS)" filed on Feb. 14, 2004, claiming priority from a U.S. Provisional application No. 60/447,533 of same title, filed on Feb. 14, 2003. It is also related to U.S. Pat. No. 7,072,651, issued Jul. 4, 2006, entitled "Method And System For Cellular Network Traffic redirection," claiming priority from U.S. Provisional application No. 60/401,362 field Aug. 5, 2002. Each of the above referenced patent applications is incorporated herein by reference in its entirety.

FIELD OF THE INVENTION

The present invention generally relates to mobile communication of roamers. More specifically, the invention relates to facilitating mobile communication of outbound roamers of a client network in visited networks and inbound roamers from home networks in the client network irrespective of client network's roaming relationships with these visited and home networks.

BACKGROUND OF THE INVENTION

Both mobile wireless telecommunications services and travel are becoming increasingly popular, leading to competition between different network operators for increasing their roaming revenues. "Roaming" occurs when a subscriber from a "home" network uses his same equipment to communicate via a "visited" network while traveling.

These operators of public mobile wireless networks generally establish roaming agreements with each other to provide various mobile services (such as call and non-call related services) to their inbound and outbound roamers in different countries (or within different zones in the same country). Establishing roaming agreements generally requires bilateral agreements (or relationships), which involves roaming commercial agreements, connection setups, International Roaming Expert Group (IREG) tests and Transfer Accounting Data International Group (TADIG) tests. These bilateral agreements allow a network operator to provide different roaming services, such as Global System for Mobile communication (GSM), General Packet Radio Service (GPRS), Customized Applications for Mobile network Enhanced Logic (CAMEL), Third Generation (3G), etc. to its inbound and outbound roamers, eventually attracting more inbound roamers from preferred networks to its networks, and compelling more of its outbound roamers to register with its preferred networks. Furthermore, the network operator may even establish unilateral agreement (e.g., CAMEL to increase its inbound roaming revenue) with some other network operators. The preferred networks are those networks that have bilateral or unilateral agreements with the network operator.

However, in certain cases, big network operators do not prefer to have roaming agreements with new and smaller network operators. In other words, maintaining the roaming agreement with these smaller network operators is not a priority for big network operators. Moreover, these small network operators cannot even afford resources of establishing and maintaining the roaming relationship with these big network operators. In addition, some network operators may wish to launch their services soon or offer new services to their roamers, both of which requires these network operators to establish roaming relationships with other network operators. However, the network operators (launching their services) cannot afford to rely on the time consuming commercial agreement process with other network operators. Hence, such network operators end up providing mobile services to their roamers in few preferred networks with limited services.

Therefore, most of the network operators look for alternative ways of establishing roaming agreements to increase their roaming coverage and provide various mobile services to their inbound and outbound roamers. In one such technique a new network operator establishes one roaming agreement with a broker operator in order to get all roaming agreements with other network operators in an ecosystem that are member networks maintained by the broker operator. However in this case, the new network operator may not join the ecosystem unless the ecosystem is large and covers the roaming agreements that are required by the new network operator. Moreover, this technique still requires broker operator to establish connection setup, and IREG and TADIG tests for such new operator.

Another technique requires a new network operator to piggyback on a host network operator's existing roaming bilateral or unilateral agreements (like GSM, CAMEL and GPRS agreements) in order to provide mobile services to its inbound and outbound roamers. In this case the new network operator utilizes the host network's roaming agreements to exchange signaling messages with selected networks that do not have direct (bilateral) roaming agreements with the new network, but do have such roaming agreements with the host network. The host network corresponds to a network that sponsors the new network operator to extend its roaming coverage to GSM, CAMEL, GPRS, or a combination thereof. Unlike the broker solution where the members of the ecosystem define the roaming coverage, the piggyback solution's roaming coverage for the new network operator is characterized by the roaming agreements of the host network with other networks. Furthermore, the new network operator can also piggyback on the host network's connection setup, and does not require or require less IREG and TADIG tests compared to the broker's solution.

One or more of the above mentioned techniques do not consider the situation where the new (or the established) network operator already possesses a roaming agreement with a roaming partner but wants to use the piggyback technique to establish another roaming relationship with the roaming partner via the host network operator. For example, an 'X' operator may already possess GSM roaming agreement with a 'Y' roaming partner; however, it may want to also establish GPRS roaming agreement with the 'Y' roaming partner (or any other roaming partner) that has no existing GPRS roaming agreement with the 'X' operator. Since different roaming coverage is provided by each relationship, such a situation is referred to as a split roaming.

Although voice accounts for majority of the roaming revenue, data agreements (like GPRS agreements) play a significant role in influencing network selection of devices. For example, a 3G device first looks for networks that support 3G.

Similarly, GPRS devices, such as blackberry and Multimedia Messaging Service (MMS) enabled devices usually first look for networks that support GPRS. As a result, even though these devices might still mainly use voice, the networks that do not have data agreements with home networks of these inbound roaming devices lose the inbound roamers using these devices (and hence lose the otherwise earned roaming revenue from these roamers). Similarly, networks that do not support CAMEL agreements lose CAMEL based prepaid inbound roamers whose home networks may apply steering techniques to move them away to networks that do support CAMEL agreements with these home networks.

In accordance with the foregoing, there is a need in the art of a system, a method, and a computer product, to support the spilt roaming situation in order to extend the roaming coverage of a network operator.

SUMMARY

The present invention is directed towards a method for facilitating exchange of one or more signaling messages between a client network and an HSRP network. The method includes identifying by an SPRS router associated with a client network, one or more parameters in the signaling messages received at the SPRS router so as to determine from the parameters one or more roaming agreements that are required between the client network and the HSRP network, to allow exchange of the signaling messages. The method further includes facilitating by the SPRS router, exchange of the signaling messages between the client network and the HSRP network via one or more SPRS hubs, when the SPRS router determines absence of the required roaming agreements. The method further includes facilitating by the SPRS router, direct exchange of the signaling messages between the client network and the HSRP network, when the SPRS router determines presence of the required roaming agreements.

Another aspect of the present invention presents a system for facilitating exchange of one or more signaling messages between a client network and an HSRP network. The system includes an SPRS router deployed at the client network. The SPRS router identifies one or more parameters in the received signaling messages so as to determine from the parameters one or more roaming agreements that are required between the client network and an HSRP network, to allow exchange of the signaling messages. Further, the SPRS router facilitates exchange of the signaling messages between the client network and the HSRP network via one or more SPRS hubs, when the SPRS router determines absence of the required roaming agreements. Further, the SPRS router facilitates direct exchange of the signaling messages between the client network and the HSRP network, when the SPRS router determines presence of the required roaming agreements.

Yet another aspect of the present invention provides a computer program product including a computer usable program code for facilitating exchange of one or more signaling messages between a client network and an HSRP network by identifying using an SPRS router associated with the client network, one or more parameters in the signaling messages received at the SPRS router so as to determine from the parameters one or more roaming agreements that are required between the client network and an HSRP network, to allow exchange of the signaling messages. Further, the computer program product facilitates exchange of the signaling messages by the SPRS router between the client network and the HSRP network via one or more SPRS hubs. Further, the computer program product facilitates direct exchange of the signaling messages by the SPRS router between the client network and the HSRP network.

BRIEF DESCRIPTION OF DRAWINGS

In the drawings, the same or similar reference numbers identify similar elements or acts.

FIGS. 10A and 1013 represent a flow diagram for routing the registration of the inbound roamer with CAMEL support at the client network to an SPRS hub first, in accordance with a second embodiment of the present invention;

DETAILED DESCRIPTION

Figure 1:
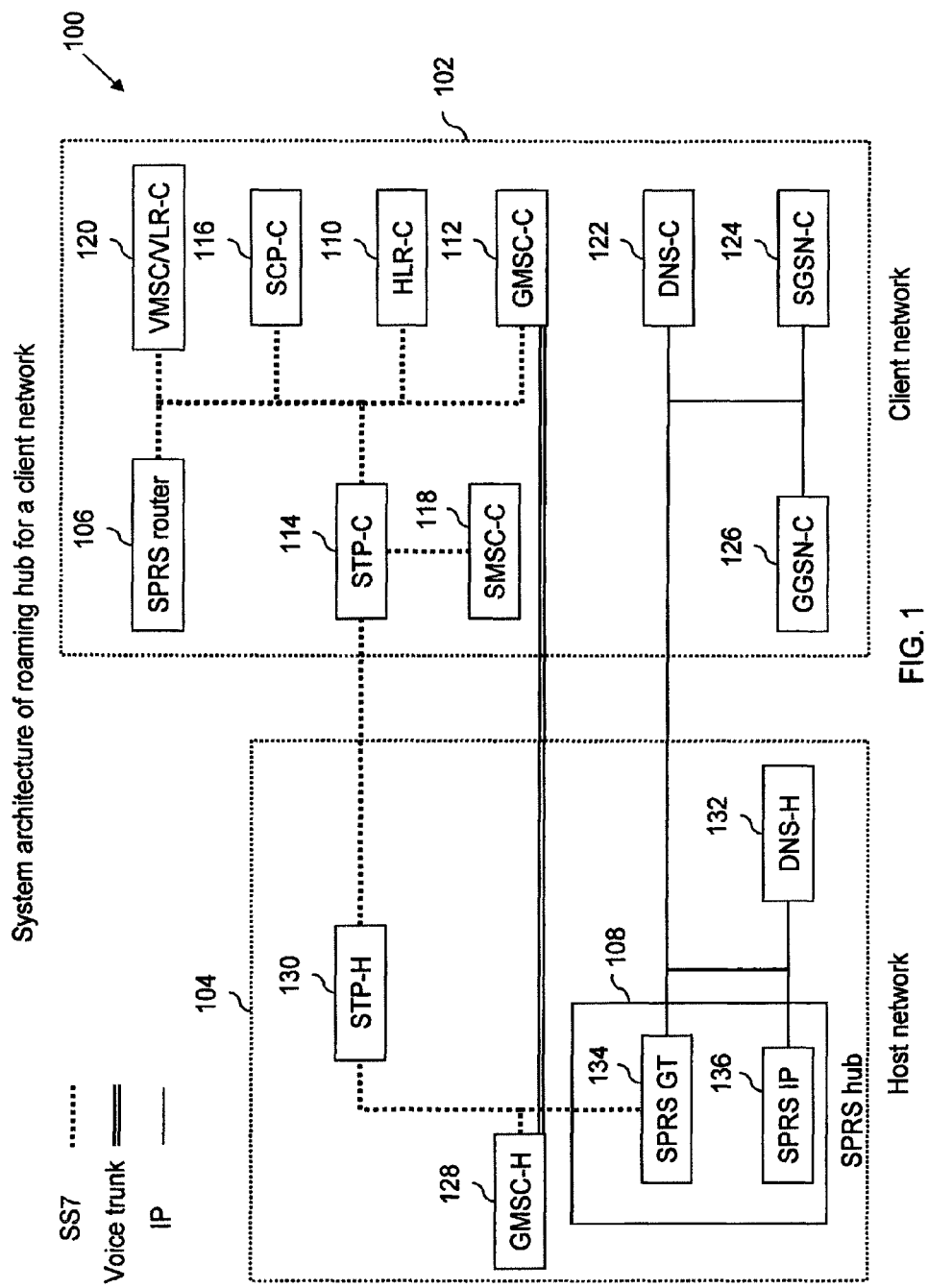
FIG. 1 illustrates a two-node Signal Packet Relay System (SPRS) for a client network to piggyback on a host network's roaming relationships with one or more Host Supported Roaming Partner (HSRP) networks, in accordance with an embodiment of the present invention.

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment. The present invention provides a system, a method, and a computer program product where a client network "piggybacks" on one or more host networks' roaming relationships (interchangeably referred to as agreements) with one or more Host Supported Roaming Partner (HSRP) networks, enabling the client network to provide roaming telecommunications services to its outbound roaming subscribers, and the subscribers of visited networks visiting (roaming) within the client network's coverage area. An HSRP network corresponds can be a mobile network operator who has established a roaming agreement with the host network, to enable inbound roaming for the host network's subscribers, and outbound roaming for its own subscribers. Generally, a good candidate to perform the role of a host network operator under the present invention would have bilateral roaming agreements with a number of HSRP network operators. But the client network operator itself lacks that volume of bilateral roaming agreements, and therefore seeks an arrangement in which it can enjoy the benefit of the host network operator's roaming agreements with those HSRP's. An object of the present invention is to enable "piggybacking" whereby a client network or a host network can implement a system, method or apparatus that permits a client network effectively to extend its roaming coverage to include bidirectional roaming with those HSRP networks, by virtue of reaching an arrangement with a host network permitting the client network to enjoy the benefit of the host network's own existing roaming relationships with those HSRPs.

"Piggybacking," in a preferred embodiment, permits the client network operator to offer inbound and outbound roaming with those HSRP networks without itself establishing such bilateral roaming agreements with the HSRP networks. In various embodiments of the present invention, piggybacking enables the client network to exchange signaling messages with the HSRP networks, thereby allowing the client network operator to provide roaming services to roamers coming from the HSRP networks (hereinafter referred to as inbound roamers) or roaming in the HSRP networks (hereinafter referred to as outbound roamers). It will be apparent to a person skilled in the art that roaming services include standard call and non-call related activities such as, but not limited to, Mobile Originated (MO) call, Mobile Terminated (MT) call, Short Message Service (SMS), Packet Data Network (PDN), and other Value Added Services (VASs).

In one embodiment of the present invention, although the client network may have an existing (bilateral or unilateral or multilateral) Global System for Mobile communication (GSM) roaming agreement with the HSRP network, it may not have a (bilateral or unilateral or multilateral) General Packet Radio Service (GPRS) roaming agreement with the HSRP network. In such a case, if the host network possesses bilateral GPRS roaming agreements with both the client network and HSRP network, the client network uses host network's GPRS roaming relationship (i.e., by piggybacking) with the HSRP network to establish the required GPRS roaming agreement with the HSRP network.

In a first embodiment of the present invention, the client operator has existing GSM roaming agreement (including voice, SMS and CAMEL) with the HSRP network, and it piggybacks on the one or more host networks to establish other roaming agreements with the HSRP network. Such a case is hereinafter interchangeably referred to as split roaming. These roaming agreements can be, but not limited to, GPRS (including GPRS, SMS and CAMEL), Customized Applications for Mobile network Enhanced Logic (CAMEL) and Third Generation (3G). Moreover, with the advent of technology the client network operator can use various embodiments of the present invention to provide roaming support and agreements for other emerging technologies like, but not limited to, WiFi, WiMax, Voice over Internet Protocol (VoIP), IP Multimedia Subsystem (IMS) and Session Initiation Protocol (SIP). For example, when the client network does not posses IMS roaming agreement with the HSRP network, the client network can piggyback on the host networks' IMS roaming agreement with the HSRP network to achieve the required IMS roaming agreement with the HSRP network. Hence, the one or more host networks are those networks that support one or more required roaming agreements between the client network and HSRP networks.

In a second embodiment of the present invention, the client network operator requires at least two roaming agreements with the HSRP network, where the client network may or may not have any existing roaming agreement with the HSRP network. Even in this case, the client network piggybacks on one or more host network's roaming agreement with the HSRP network to maintain the required roaming agreements. Various embodiments of the present invention consider this scenario as split roaming. Both these scenarios of split roaming result in extending the roaming coverage of the client network using the roaming coverage of the one or more host networks.

FIG. 1 illustrates a two-node Signal Packet Relay System (SPRS) 100 that allows a client network 102 to piggyback on a host network 104's roaming relationships with one or more HSRP networks, in accordance with an embodiment of the present invention. Client network 102 includes an SPRS router 106, while host network 104 includes an SPRS hub 108. In an earlier approach, as taught by the inventor of U.S. patent application Ser. No. 10/778,861, filed on Feb. 14, 2004, a method and system for allowing a client network to piggyback on a host network's GPRS roaming relationships is provided. This filing is hereinafter referred to as "previous SPRS filing". In various embodiments of the present invention, SPRS hub 108 corresponds to an SPRS node of the previous SPRS filing. In this case, SPRS router 106 communicates with the SPRS node to implement various embodiments of the present invention. In another embodiment of the present invention, SPRS hub 108 is an existing hub deployed by a third party operator. The functioning of SPRS router 106 at client network 102 does not affect the functionality of the third party hub or the SPRS node of the "previous SPRS filing". Client network 102, which is otherwise unable to support the required roaming agreement (e.g., GSM, GPRS, CAMEL, 3G etc.) with the HSRP networks, uses SPRS router 106 and SPRS hub 108 to establish the required roaming agreement with the HSRP networks. In one embodiment of the present invention, an inbound roamer from an HSRP network registers with client network 102. In another embodiment of the present invention, an outbound roamer of client network 102 registers with the HSRP network.

SPRS 100 further includes in client network 102, a Home Location Register (HLR-C) 110, a Gateway Mobile Switch Center (GMSC-C) 112, a Signal Transfer Point (STP-C) 114, a Signaling Control Point (SCP-C) 116 and a Short Message Service Center (SMSC-C) 118. Client network 102 further includes a Visited Location Register (VLR-C) 120 that is integrated with a Visited Mobile Switching Center (VMSC). Since VLR-C 120 communicates with its integrated VMSC using an internal communication interface (called B-interface) and a Sub System Number (SSN), and they collectively reside in client network 102, they are hereinafter interchangeably referred to as VMSC/VLR-C 120. SPRS router 106, HLR-C 110, GMSC-C 112, STP-C 114, SCP-C 116, SMSC-C 118 and VMSC/VLR-C 120 are interconnected, and communicate with each other over Signaling System #7 (SS7) links (illustrated as dotted lines in FIG. 1). Additionally, in case client network 102 supports GPRS, client network 102 also includes a Domain Name Service (DNS-C) 122, a Serving GPRS Support Node (SGSN-C) 124 and a Gateway GPRS Support Node (GGSN-C) 126. DNS-C 122, SGSN-C 124 and GGSN-C 126 are interconnected, and communicate with each other over an Internet Protocol (IP) connection.

Furthermore, SPRS 100 includes in host network 104, a GMSC-H 128, an STP-H 130, and a DNS-H 132. SPRS hub 108 uses an SPRS Global Title (GT) 134 functional module for SS7 relay and an SPRS IP 136 functional module for GPRS IP relay. SPRS hub 108 uses these functional modules to replace client network 102's addresses (i.e. GT or IP address) with corresponding SPRS hub 108's addresses. In an embodiment of the present invention, SPRS router 106 and SPRS hub 108 are logical modules that are integrated with existing network elements such as STPs. In this case, SPRS router 106 may be integrated with STP-C 114, and SPRS hub 108 may be integrated with STP-H 130. In another embodiment of the present invention, SPRS hub 108 is integrated with SPRS router 106, and they are deployed by either host network 104 or client network 102. Moreover, these logical modules can be deployed either in the same platform or in separate platforms, and they communicate with each other via a signaling bearer protocol including, but not limited to, IP, Signalling Transport (SIGTRAN) and SS7. GMSC-H 128, STP-H 130 and SPRS GT 134 are interconnected, and communicate with each other over SS7 links. Similarly, DNS-H 132 and SPRS IP 136 are interconnected, and communicate with each other over the IP connection. Also, GMSC-H 128 communicates with GMSC-C 112 via a voice trunk connection. It will be apparent to a person skilled in the art that in case client network 102 and host network 104 reside in different countries, SPRS 100 will also include an International Service Carrier (ISC) between client network 102 and host network 104. It will also be apparent to a person skilled in the art that client network 102 and host network 104 may also include various other network components, depending on the architecture under consideration.

Figure 2:
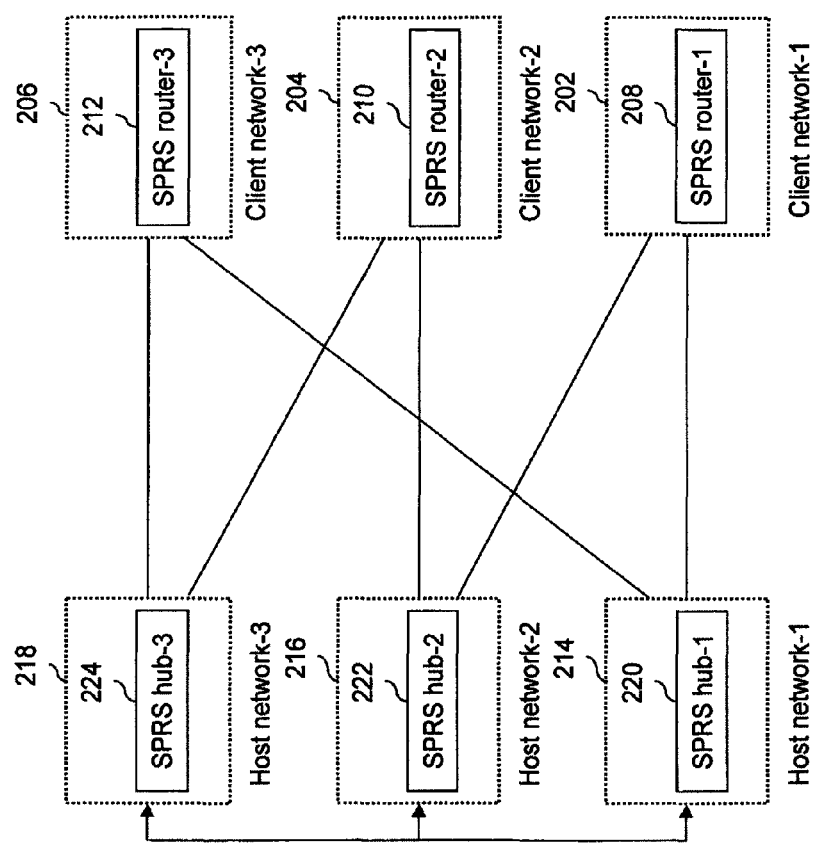
FIG. 2 illustrates interconnection between plurality of host networks and plurality of client networks, in accordance with an embodiment of the present invention.

Furthermore, plurality of host and plurality of client networks may communicate with each other to extend roaming coverage of these client networks. FIG. 2 illustrates interconnection between plurality of host networks and plurality of client networks, in accordance with an embodiment of the present invention. The plurality of client networks includes a client network-1 202, a client network-2 204 and a client network-3 206. Client network-1 202, client network-2 204 and client network-3 206 include an SPRS router-1 208, an SPRS router-2 210 and an SPRS router-3 212, respectively. In an embodiment of the present invention, when there is a group of client network operators across multiple circles within the same country sharing SPRS router, in such a case SPRS router is deployed at a central location like an international SS7 carrier.

The plurality of host networks includes a host network-1 214, a host network-2 216 and a host network-3 218. Host network-1 214, host network-2 216 and host network-3 218 include an SPRS hub-1 220, an SPRS hub-2 222 and an SPRS hub-3 224, respectively. In a first embodiment of the present invention, host network-1 214 uses SPRS hub-1 220 to support plurality of client networks (client network-1 202 and client network-3 206 as shown in FIG. 2), where each client network has an associated SPRS router. Since host network-1 214 may have GPRS or CAMEL or 3G roaming agreement with many HSRP networks, host network-1 214 may extend these agreements to plurality of client networks. In such a case, SPRS hub-1 220 stores information that includes, but not limited to, blacklist and whitelist of HSRP networks and identity mappings (e.g., host IMSI and client IMSI mapping in case of dual IMSI outbound roaming, client network entity and SPRS hub-1 220 entity mapping, HSRP network entity and SPRS hub-1 220 entity mapping, etc.) for each supported client network in its database. For example, SPRS hub-1 220 can store a mapping between the HSRP network entity such as VMSC/VLR in the HSRP network and SPRS hub-1 220, and a mapping between the client network entity such as VMSC/VLR in the client network and SPRS hub-1 220. Detailed explanation of these exemplary cases is described later in the context of the present invention. Using blacklisting and white-listing criteria, SPRS hub-1 220 allows selective exchange of the signaling messages between its client networks (i.e., client network-1 202 and client network-3 206) and the HSRP networks via SPRS hub-1 220. This means that in case SPRS hub-1 220 receives signaling messages destined for an HSRP network 'X' that is white-listed in SPRS hub-1 220's database, SPRS hub-1 220 allows routing of these signaling messages. However, when SPRS hub-1 220 receives signaling messages destined for an HSRP network 'Y' that is blacklisted in SPRS hub-1 220's database, SPRS hub-1 220 restricts the signaling message to be routed via itself. In one embodiment of the present invention, these restricted messages are dropped, and hence not processed any further. In another embodiment of the present invention, SPRS hub-1 220 sends a Signaling Connection Control part (SCCP) UniDaTa Services (UDTS) message with a return cause such as, but not limited to, "the destination is unreachable" and "there is no translation for the destination" to client network-1 202 (if client network-1 202 is the one that has earlier issued the signaling message towards the HSRP network 'Y').

In order to extend the roaming coverage, client network-1 202 piggybacks on plurality of host networks (e.g., host network-1 214 and host network-2 216 as shown in FIG. 2), where each host network has an associated SPRS hub, in accordance with a second embodiment of the present invention. SPRS router-1 208 then stores information about each host network in its database. This information includes, but not limited to, roaming agreements between plurality of HSRP networks and the plurality of the host networks, and client network-1 202 operator's required roaming agreements with plurality of host network operators. This information allows SPRS router-1 208 to determine which host network is required by client network-1 202 operator to piggyback and establish a particular required roaming agreement with the HSRP network operator.

In an embodiment of the present invention, the plurality of host networks share a common SPRS hub-1 220 deployed at the central location. In another embodiment of the present invention, host network(s) deploy multiple hubs at a location where there is a local SS7 connection between the host network(s). In yet another embodiment of the present invention, each host network deploys multiple SPRS hubs to support client network-1 202 for different required roaming agreements with the HSRP network(s). In one instance, host network-1 214 supports CAMEL roaming with the HSRP network, and host network-2 216 supports both GPRS and 3G roaming with the same HSRP network. In another instance, client network-1 202 establishes a GSM roaming agreement with the HSRP network via host network-1 214, and a GPRS roaming agreement with the same HSRP network via another host network-2 216. This is done by piggybacking on the former host network-1 214's GSM roaming agreement, and the latter host network-2 216's GPRS roaming agreement with the HSRP network. In this case, when client network-1 202 caters to the inbound roamer from the HSRP network; the inbound roamer's HLR associated with the HSRP network may have a VMSC/VLR address of client network-1 202 and an SGSN address of host network-2 216. Thus, the HSRP network believes that its roamer is GSM registered with client network-1 202 and GPRS registered with host network-2 216. However, from the roamer's device perspective, it is GSM and GPRS registered with the same client network-1 202 that has same network code for GSM and GPRS. It will be apparent to a person skilled in the art that neither Third Generation Partnership Project (3GPP) standard nor any existing HLR forbids such a situation. In fact 3GPP standard (e.g., GSM 29.002 and GSM 23.012) allows such a situation where a mobile device may be GSM registered with one network and GPRS registered with another network at the same time; although, the mobile device will try to synchronize its registration with the same network. For example, a blackberry device registered with a network A supporting both GSM and GPRS looks for an alternative network B with GPRS support when the current network A looses the GPRS coverage for the blackberry device. Thus in this case, there is a time gap that the blackberry device is GSM registered with network A and GPRS registered with network B, although this device will later synchronize its registration by GSM registering with the network B.

In the above mentioned case of spilt roaming, the TAP records presented by two different networks (i.e., one for GSM and another for GPRS) to client network-1 202 can cover the same or close time intervals. These networks can be from same or different countries. Moreover, there is no fraud incurred in such cases, since 3GPP standards allow having GSM and GPRS registration at different networks. This situation of billing in spilt roaming is similar to the billing concept in piggyback roaming explained in the previous SPRS filing, where the TAP records from a competitor network operator (corresponds to the HSRP network operator of the present invention) to the client network operator and the TAP records from the host network operator to the client network operator may overlap in time (e.g., seconds, minutes, etc.).

In a third embodiment of the present invention, client network-2 204 piggybacks on host network-2 216 and host network-3 218 to support both GSM and GPRS roaming with the HSRP network. SPRS hub-2 222 supports GSM agreement with the HSRP network and SPRS hub-2 222 further interacts with SPRS hub-3 224 to establish required GPRS agreement with the HSRP network. Similarly, client network-3 206 can piggyback on roaming relationships with host network-1 214 and host network-3 218, in order to establish the required roaming agreements with the HSRP network.

In a third embodiment of the present invention, the SPRS hubs and SPRS routers are cascaded. In this case, a first host network uses an SPRS hub to support client network operator's required roaming agreements, and the first host network also deploys an SPRS router to piggyback on a second host network that also deploys an SPRS hub. This is beneficial for a client network operator that has some existing roaming agreements with network operators and it requires:

a) Other roaming agreements with the same or other network operators, or b) Similar types of roaming agreements with other network operators, in order to offer a complete package of roaming services to the client network operator.

For example, a network N1 that has many GSM, GPRS and 3G relationships, but few CAMEL relationships can be a host network operator for many client network operators. By piggybacking on a network N2's CAMEL agreements, the N1 network can also offer CAMEL extension to its client networks. From the N1's client networks perspective, the N1 network provides CAMEL extension although it is actually handled in the backend by the N2 network. In this case, each client network of the N1 network needs to have an SPRS router to handle the split roaming scenario. Also, the N1 network needs to have both an SPRS router and an SPRS hub. In order to handle CAMEL billing in this case, the N1's client network sends bill to the N1 network, which can then send it to the N2 network. Finally, the N2 network sends the bill to the HSRP network. It will be apparent to a person skilled in the art that any combination of split roaming is possible within the scope of the present invention.

Figure 3:
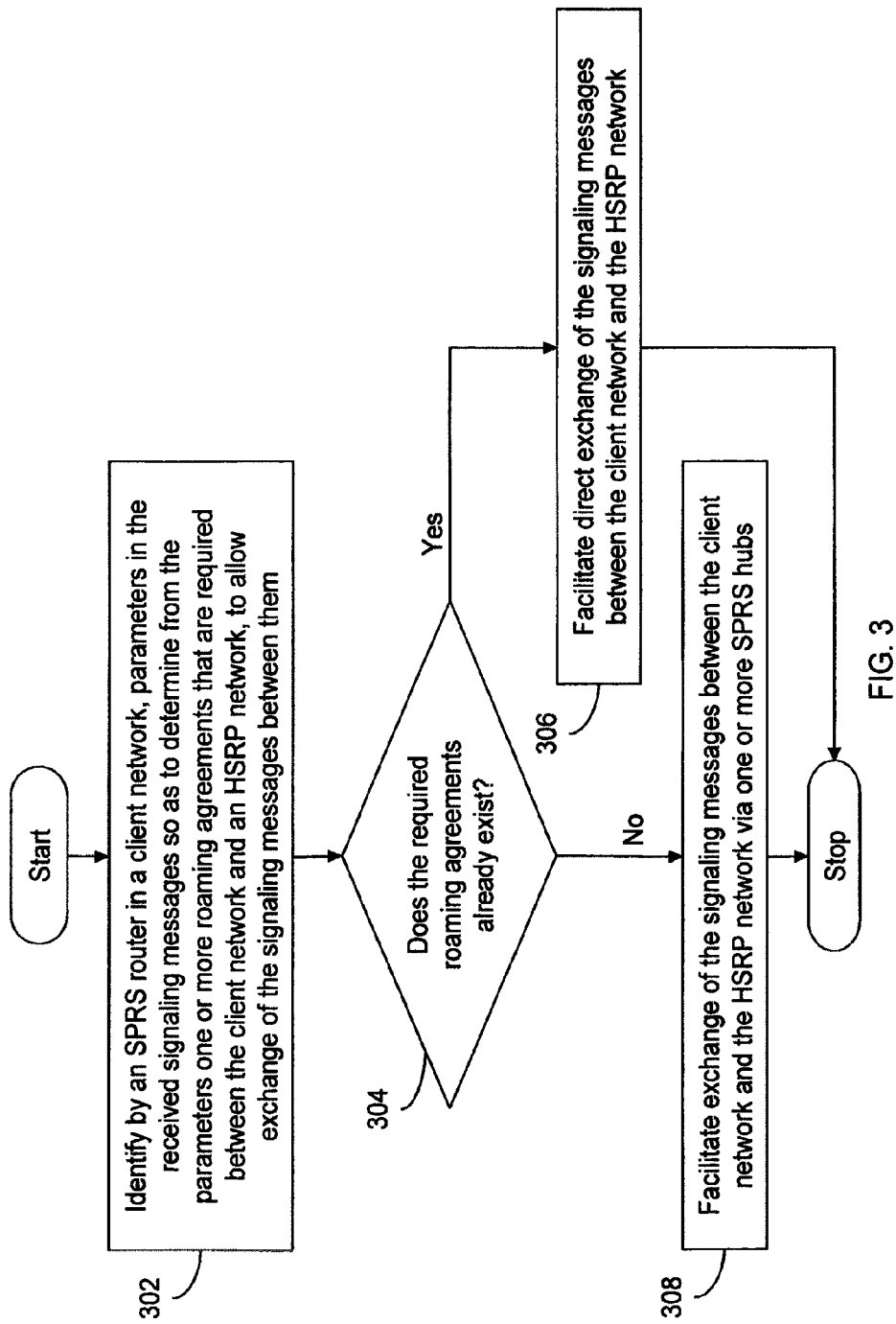
FIG. 3 represents a flowchart for extending roaming coverage of the client network, in accordance with an embodiment of the present invention.

In order to support client network 102 operator's required roaming agreements with the HSRP network operator, client network 102 first needs to determine which roaming agreements are required, and based on this determination client network 102 then piggybacks on the selected host network(s) that support those required roaming agreements. FIG. 3 is a flowchart for extending roaming coverage of client network 102, in accordance with an embodiment of the present invention. At step 302, SPRS router 106 identifies one or more parameters in signaling messages received at SPRS router 106 so as determine from these parameters one or more roaming agreements that are required between client network 102 and the HSRP network. These roaming agreements allow exchange of the signaling messages between client network 102 and the HSRP network. In an embodiment of the present invention, the received signaling messages originate from client network 102 and are destined for the HSRP network. The signaling messages include a Send Routing Information (SRI), a FwdSMS, an SRI-SM-ACK, a RESET and a standalone Insert Subscriber Data (ISD) in case of outbound roaming scenario explained later in the context of the present invention. Similarly, the signaling messages include a Location Update (LUP), a GPRS-LUP, FwdSMS and a Service Switching Point-Signaling Control Point (SSP-SCP) CAMEL Application Part (CAP) in case of inbound roaming scenario also explained later in the context of the present invention. In an embodiment of the present invention, client network 102 operator configures STP-C 114 to direct the signaling messages with an SCCP Called Party Address (CdPA) prefixed with Country Code (CC) National Dialing Code (NDC) of the HSRP network to SPRS router 106. In this case, STP-C 114 whose client network 102 does not have bilateral GSM/GPRS/CAMEL/3G agreement with the HSRP network routes all HSRP network destined signaling messages to SPRS router 106. In order to deal with SPRS router 106 failure, client network 102 operator configures STP-C 114 to secondary (or fail-over) route the signaling messages to an International STP (ISTP) associated with the ISC. This is done to at least have normal roaming configurations in case SPRS router 106 goes down.

In an embodiment of the present invention, SPRS router 106 is capable of determining the host networks that support the required roaming agreements. The detailed explanation about the method to determine the host network is given later in the context of the present invention. In an embodiment of the present invention, SPRS router 106 detects SSN of a CdPA and Transaction Capabilities Application Part (TCAP) content (e.g., 3G parameters in case of 3G signaling messages and CAMEL parameters in case of CAMEL signaling messages) as the parameters in the signaling messages and using these parameters determines the routing path of these messages. In another embodiment of the present invention, in case the SSN is identical for two CdPAs of the signaling messages then SPRS router 106 identifies the routing path based on the CdPA of the signaling message. In both the above embodiments, the routing path is determined by identifying the type of required roaming agreements corresponding to such signaling messages. The types of required roaming agreements considered are, but not limited to, GSM, GPRS, CAMEL, 3G and High Speed Downlink Packet Access (HSDPA). For GSM roaming, the SSN can be HLR (SSN=6), VLR (SSN=7), GMSC (SSN=8), VMSC (SSN=8), SMSC (SSN=8), and so on. For GPRS roaming, the SSN can be SGSN (SSN=95) and GGSN (SSN=96). For CAMEL Application Protocol (CAP) messages, the SSN can be CAP (SSN=92) and SCP (SSN=93). For 3G roaming, the SSN can be RANAP (SSN=8E) and RNSAP (SSN=8F). For 3G and CAMEL roaming, unless Mobile Application Part (MAP) parameters can be distinguished (e.g., CAMEL profile, CAMEL support, Immediate Service Termination (IST), SuperCharge support, etc.) as 3G, SPRS router 106 uses the SSN of 3G and CAMEL to determine the required roaming agreements.

Once the type of required roaming agreements in the HSRP network destined signaling message is determined using the parameters, then SPRS router 106 at step 304 checks whether the required roaming agreements already exist. SPRS router 106 relieves client network 102's STPs from the responsibility of determining the routing path of the HSRP network destined signaling messages (i.e., either bilateral route to the HSRP network or via host network 104). This saves complex interactions at the STPs that may be required to determine the routing path. If at step 304, SPRS router 106 determines that required roaming agreements already exists, then at step 306, SPRS router 106 bypasses the signaling message directly to the HSRP network without any modification. Subsequent signaling messages are also exchanged directly between client network 102 and the HSRP network. The direct path of the signaling messages between client network 102 and the HSRP network bypassing host network 104 is hereinafter referred to as bilateral route, in accordance with an embodiment of the present invention. The direct routing can also be done by using an alternate STP (either at client network 102 or at the ISC) or with the same STP-C 114 using a different Translation Type (TT) to avoid looping.

Alternatively, if at step 304, SPRS router 106 identifies that roaming agreement does not exist then at step 308 SPRS router 106 facilitates exchange of the signaling messages between client network 102 and the HSRP network via the one or more SPRS hubs. For the sake of convenience, only one SPRS hub, i.e., SPRS hub 108 is considered from one or more SPRS hubs to explain various embodiments of the present invention. In an embodiment of the present invention, SPRS router 106 encapsulates the HSRP network destined signaling messages before sending the encapsulated messages to SPRS hub 108. The encapsulation is primarily done to avoid the use of leased line and GT manipulation. It will be apparent to a person skilled in the art that SPRS router 106 can encapsulate the signaling messages using various existing techniques. Some exemplary encapsulation techniques include, but not limited to:

- an IP connection to send the signaling message via an IP protocol (e.g., Short Message Peer to Peer (SMPP), Hypertext Transport Protocol (HTTP), Socket, SIGTRAN, etc.)
- a MAP SS7 message format over SS7 connection (possibly over IP, e.g. SIGTRAN)
- Routing prefixes where the CdPA of the signaling message is prefixed with SPRS hub 108 destined prefix
- Simple Message Transfer Part (MTP) level routing of the signaling message over a dedicated connection (e.g., leased line), and
- An international point code for routing the signaling message to SPRS hub 108.

Once SPRS hub 108 receives the encapsulated signaling messages, it de-capsulates them prior to relaying it to the HSRP network. Thereafter, SPRS hub 108 allow exchange of subsequent signaling messages between client network 102 and the HSRP network for the required roaming agreement. Thus, host network 104 extends roaming relationships of client network 102 to support both client network 102's outbound and inbound roamers. For outbound roaming, client network 102's outbound roamer uses a dual IMSI SIM that contains a host IMSI (hereinafter referred to as IMSI-H) and a client IMSI (hereinafter referred to as IMSI-C) to roam in the HSRP network, in accordance with an embodiment of the present invention. This case of outbound roaming is hereinafter referred to as 'dual IMSI solution for outbound roaming'. Alternatively, in another embodiment of the present invention, the outbound roamer uses his existing client SIM that contains IMSI-C to roam in the HSRP network. This case of outbound roaming is hereinafter referred to as 'single IMSI solution for outbound roaming'.

Outbound Roaming Solutions

Various embodiments in the dual IMSI solution of the present invention to handle split roaming scenarios are same as the embodiments in the dual IMSI solution of the previous SPRS filing. However, some configurations are done at the HSRP network and host network 104 in order to handle the 'single IMSI solution for outbound roaming' solution of the present invention. In an embodiment of the present invention, client network 102 operator selects some HSRP networks for applying the single IMSI logistics. The single IMSI solution does not require the outbound roamer to change his existing client network 102 SIM, thereby avoiding the interactions of a dual IMSI SIM application with existing SIM applications. However host network 104 needs to provide client network 102's information (such as IMSI-C, SMSC-C 118, SCP-C 116 etc.) to its HSRP networks via various GSM Association (GSMA) PRDs IR 21, AA 13, AA 14, AA 19, AA 31, etc. Since GSMA BARG document BA 21 for 'inbound roaming network extension' may involve such a process of providing client network 102's information, the single IMSI solution for outbound roaming can be taken an add-on.

Furthermore, in order to handle the single IMSI solution for outbound roaming, the HSRP network operator configures its VMSC/VLR in case of GSM piggyback roaming (or the outbound roamer's HSRP SGSN in case of GPRS piggyback roaming) with IMSI analysis on a Mobile Country Code (MCC) or a Mobile Network Code (MNC) of client network 102 to map them in one of the following two ways:

1. To an address of SPRS hub 108, and
2. To a CC NDC of client network 102

Also, the HSRP SGSN or the host SGSN needs to devise a way (e.g. via an internal DNS or a GPRS Roaming eXchange (GRX) DNS) to perform DNS resolution on an Access Point Name (APN) of client network 102 to packet access GGSN-C 126.

In addition, when client network 102 operator requires GSM roaming agreement with the HSRP network operator, then the HSRP network operator needs to configure its HSRP STP to perform GT modification in order to route client network 102 destined signaling messages to SPRS hub 108. This is done by modifying an "SCCP CdPA=<CC NDC of client network 102><rest-of-GT>" to "SCCP CdPA=<CC NDC of host network 104><SPRS hub 108 prefix><rest-of-GT>". Such a modification will handle the cases of E.164 HLR-C 110 access (e.g., the LUP, Unstructured Supplementary Service Data (USSD), Supplementary Service (SS), ISD-ACK etc.), SMSC-C 118 access (e.g., MO-SMS, MT-Fwd-SMS-ACK, etc.) and SCP-C 116 access (e.g., Initial DP (IDP) for CAMEL, SMS, GPRS etc.) for client network 102's outbound roamer at the HSRP network. It will also handle the SMS interworking and MO SMS by the outbound roamer from the HSRP network to client network 102. Since STPs can generally handle length of GT up to 18 digits, the HSRP network operator can add CC NDC of host network 104 and SPRS hub 108 prefix to SCCP CdPA until GT length becomes 18 digits. However, in some cases such GT modification may not be possible or the length of the modified GT exceeds the limit that the HSRP STP can handle. In these cases, SPRS hub 108 uses TCAP parameters such as IMSI to reproduce the real CdPA such as those for HLR, SMSC, SCP, VLR, VMSC etc.

In order to handle the case where the HSRP network already has existing GSM roaming agreement with client network 102, and client network 102 operator requires CAMEL, GPRS or 3G via host network 104 operator, the HSRP network needs to distinguish SCCP signaling between normal GSM and CAMEL/GPRS/3G. This is achieved by having different types of IMSI analysis between VMSC/VLR and SGSN of the HSRP network, in accordance with a first embodiment of the present invention. For example, the HSRP VMSC/VLR can use the CC NDC of client network 102, whereas the HSRP SGSN can use SPRS hub 108 prefix. However for HSRP network to distinguish SMS and CAMEL messages between GSM and GPRS bearers, the HSRP SGSN and the HSRP VMSC/VLR, or a host SMSC corresponding to SMSC-C 118 and a host SCP corresponding to SCP-C 116 are used. Similarly, in order to handle SMS interworking the messages are sent to an SMS interworking gateway. In a second embodiment of the present invention, the HSRP network uses an enhanced STP to examine SSN of both Calling Party Address (CgPA) and CdPA of client network 102 destined signaling messages. In order to distinguish 3G and CAMEL within MAP messages, the HSRP network operator requires the enhanced STP or the HSRP SGSN/VMSC/VLR that examines TCAP messages and offers differentiate routing based on different types of TCAP messages. This enhanced STP can be provided either by the HSRP network operator or by a third party network operator (e.g., a GSMA defined Open Connectivity (OC) hub or an international SCCP carrier). In an embodiment of the present invention, the HSRP network operator uses existing enhanced STP for examining TCAP messages in order to handle the single IMSI solution for outbound roaming.

The outbound roamer's GSM and GPRS registration process for the dual IMSI solution follows the previous SPRS filing, where the SPRS node of the previous SPRS filing functions as SPRS hub 108. Similarly, the outbound roamer's GSM and GPRS registration process for the single IMSI solution follows the dual IMSI solution explained in the previous SPRS filing, except that the IMSI-H is replaced with the IMSI-C. However, in an embodiment of the present invention for the single IMSI solution, SPRS hub 108 detects a registration attempt of the outbound roamer at the HSRP network, where the outbound roamer uses IMSI-C to register with the HSRP network. Also in this case, when SPRS hub 108 receives the LUP (or GPRS-LUP) message from the HSRP VMSC/VLR, SPRS hub 108 does not modify the SCCP CgPA of the LUP message (i.e. CgPA is set as the HSRP VLR). Thus, when HLR-C 110 returns an ISD message towards HSRP VLR, STP-C 114 relays it to SPRS router 106. Detailed involvement of SPRS router 106 will be shown later in other signal flows of outbound roaming. Since HLR-C 110 has actual address/location of the outbound roamer (i.e., VMSC/VLR/SGSN), HLR-C 110 is able to determine the correct roaming profile to apply and help those value added applications (such as traffic steering, welcome SMS, prepaid for outbound, etc.), which depend upon the outbound roamer's actual location.

Figure 4:
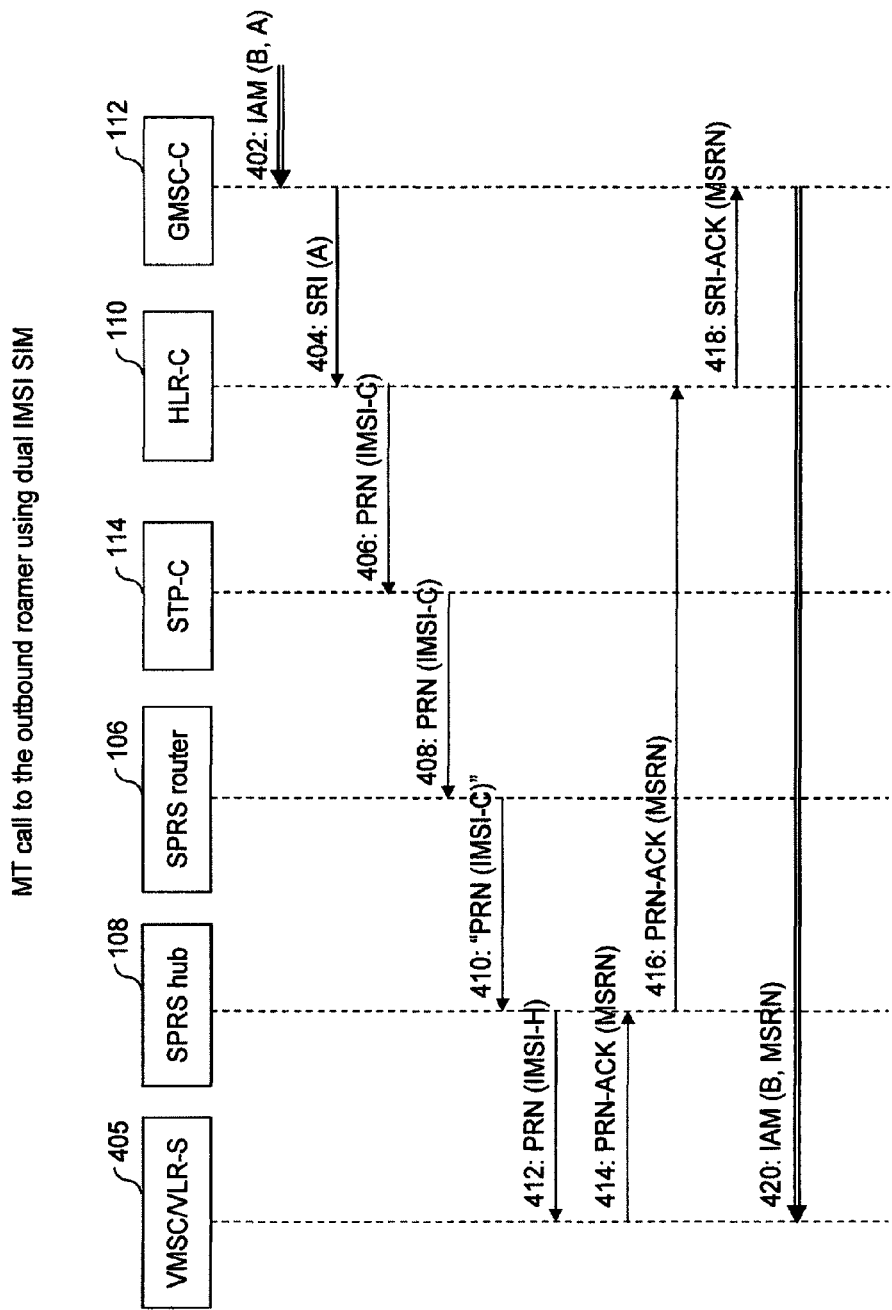
FIG. 4 represents a flow diagram for facilitating Mobile Terminated (MT) call to the outbound roamer using dual International Mobile Subscriber Identity (IMSI) Subscriber Identity Module (SIM), in accordance with an embodiment of the present invention.

Furthermore, SPRS router 106 facilitates MT call to the outbound roamer by exchanging signaling messages between the HSRP network and client network 102 via SPRS hub 108 when these two networks do not posses the required GSM agreement with each other. FIG. 4 represents a flow diagram for facilitating MT call to the outbound roamer using dual IMSI SIM, in accordance with an embodiment of the present invention. All call flows for outbound roaming solutions consider the outbound roamer as 'A'. When a calling party B calls A, GMSC-C 112 receives an ISDN User Part (ISUP) IAM (B, A) message, at step 402. Thereafter, at step 404, GMSC-C 112 issues a MAP SRI (A) message to HLR-C 110 of A. HLR-C 110 then issues a MAP PRN (IMSI-C) towards a VMSC/VLR-S 405, associated with the HSRP network. All network elements in the HSRP network are hereinafter referred with a notation 'S' (e.g., VMSC in the HSRP network is referred to as VMSC-S). However, at steps 406 and 408, STP-C 114 directs the HSRP network destined signaling message (i.e., PRN (IMSI-C)) to SPRS router 106.

Furthermore, SPRS router 106 determines the required roaming agreement from the PRN message (i.e., GSM in this case) by examining the SSN in the SCCP CdPA and the TCAP content of the PRN message (e.g., 3G and CAMEL parameters). In one embodiment of the present invention, SPRS router 106 determines using its database that there exists bilateral GSM roaming relationship between client network 102 and the HSRP network, where the HSRP network is determined using the CC NDC of VMSC/VLR-S 405. Thus, SPRS router 106 bypasses the PRN message to VMSC/VLR-S 405, and standard MT call flow follows where SPRS hub 108 is not involved.

Alternatively, in another embodiment of the present invention, SPRS router 106 determines absence of the required GSM roaming agreement between the HSRP network and client network 102, and hence host network 104 is required to support the required GSM roaming agreement. Therefore, at step 410, SPRS router 106 encapsulates the PRN message, and sends it to SPRS hub 108. All encapsulated signaling messages are hereinafter represented in double inverted commas (e.g., "PRN (IMSI-C)"), in accordance with various embodiment of the present invention. Thereafter, at step 412, SPRS hub 108 de-capsulates the PRN message, modifies SCCP CgPA from HLR-C 110 to an SPRS-HLR GT of SPRS hub 108 and also modifies IMSI-C to IMSI-H prior to relaying the PRN message to VMSC/VLR-S 405. VMSC/VLR-S 405 then returns an HSRP roaming number, such as Mobile Station Roaming Number (MSRN) of the HSRP network in a MAP PRN-ACK message to SPRS hub 108, at step 414.

In one embodiment of the present invention, SPRS hub 108 relays the PRN-ACK message to HLR-C 110, at step 416. Thereafter, at step 418, HLR-C 110 sends an SRI-ACK (MSRN) message to GMSC-C 112. In case client network 102 already has trunk route from its network directly towards the HSRP network's MSRN ranges, GMSC-C 112 continues the call set up IAM (B, MSRN) towards VMSC/VLR-S 405, at step 420.

Alternatively, in another embodiment of the present invention, when client network 102 does not have any trunk route from its network directly towards the HSRP network's MSRN ranges, after step 414, SPRS hub 108 sends a host roaming number, such as host MSRN corresponding to the HSRP MSRN back to HLR-C 110. HLR-C 110 then sends the SRI-ACK (host MSRN) to GMSC-C 112. GMSC-C 112 then continues the call set up IAM (B, host MSRN) towards GMSC-H 128. It will be apparent to a person skilled in the art that in case one or more host networks fulfill client network 102 operator's required GSM roaming agreement, the MT call to the outbound roamer will be routed via GMSCs of corresponding host networks. For example, if two host networks H1 and 112 in combination (as mentioned earlier in conjunction with FIG. 2) support the required GSM roaming agreement between client network 102 and the HSRP network, then the MT call to subscriber A will be routed via GMSC of H1 and GMSC of H2. However, for the sake of convenience we have considered one hub in one host network (i.e., SPRS hub 108 in host network 104). GMSC-H 128 then routes the signaling message via a message interface to SPRS hub 108. SPRS hub 108 then returns the HSRP MSRN to GMSC-H 128 via the message interface. The message interface can be, but not limited to, ISUP, Intelligent Network (IN), Telephone User Part (TUP), etc. GMSC-H 128 then routes the MT call with the HSRP MSRN towards VMSC/VLR-S 405.

Similarly, call flow for MT call to the outbound roamer in case of single IMSI solution for outbound roaming follows the call flow explained above in conjunction with FIG. 4, except that the IMSI-H is replaced with the IMSI-C.

Figure 5:
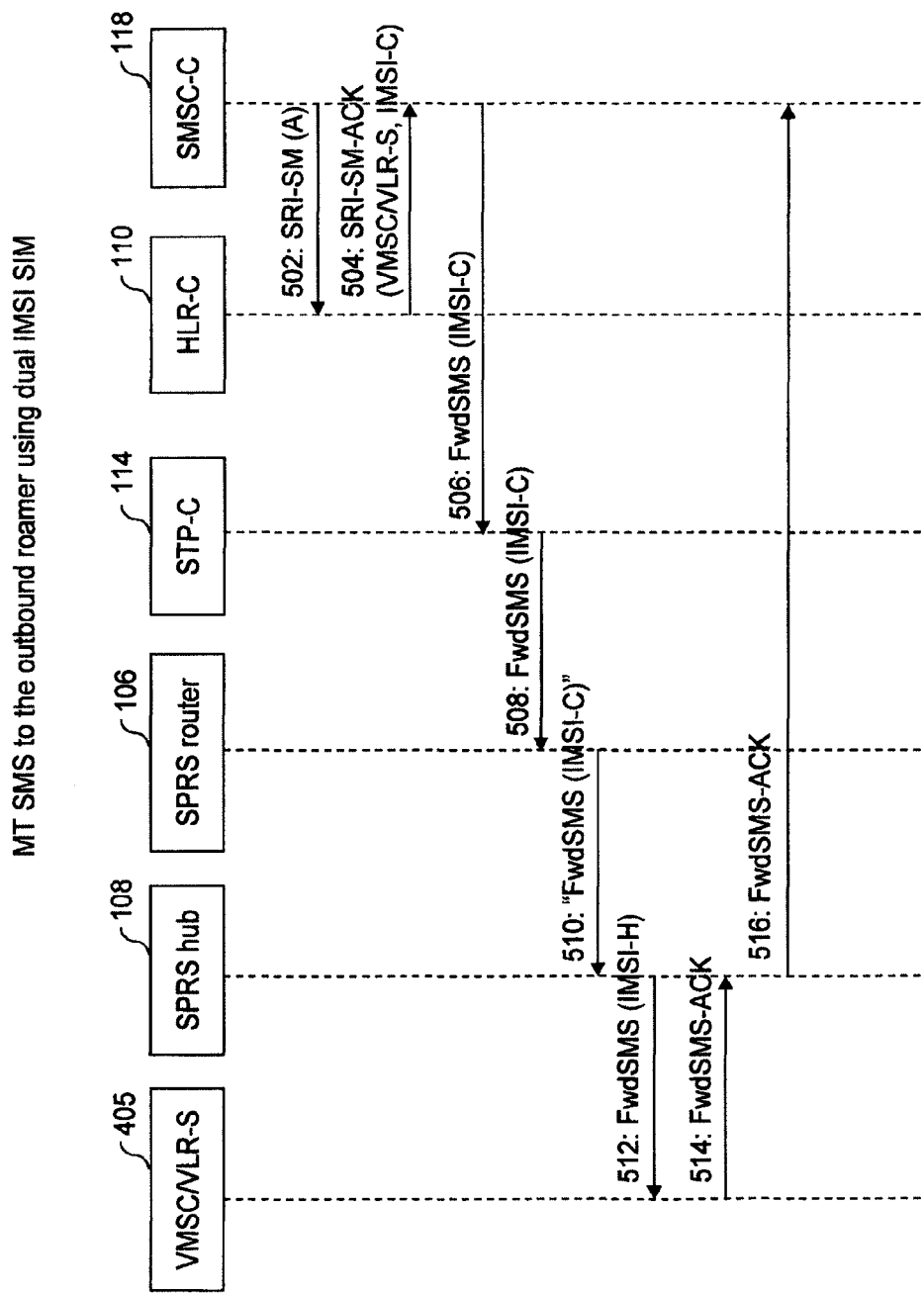
FIG. 5 represents a flow diagram for facilitating MT Short Message Service (SMS) from a client Short Message Service Center (SMSC) to the outbound roamer using the dual IMSI SIM, in accordance with a first embodiment of the present invention.

The outbound roamer in the HSRP network can also receive SMS while being registered with the HSRP network. FIG. 5 represents a flow diagram for facilitating MT SMS from SMSC-C 118 to the outbound roamer using the dual IMSI SIM, in accordance with a first embodiment of the present invention. When SMSC-C 118 receives the MT SMS from a sender B, SMSC-C 118 issues an SRI-SM (A) message to HLR-C 110, at step 502. Thereafter, at step 504, HLR-C 110 returns an SRI-SM-ACK message with VMSC/VLR-S 405 address (or HSRP SGSN/host SGSN address in case of GPRS) and IMSI-C of A to SMSC-C 118. SMSC-C 118 forwards the MT SMS on the IMSI-C towards VMSC/VLR-S 405. However, at steps 506 and 508, STP-C 114 directs VMSC/VLR-S 405 destined FwdSMS (IMSI-C) message to SPRS router 106.

Thereafter, SPRS router 106 determines the required roaming agreement from the FwdSMS (IMSI-C) message in a similar way as explained earlier for the PRN message (in conjunction with FIG. 4). Thus, at step 510, SPRS router 106 encapsulates the FwdSMS message, and sends it to SPRS hub 108, when the required roaming agreement is determined to be absent. Thereafter, at step 512, SPRS hub 108 de-capsulates the FwdSMS message, modifies SCCP CgPA from HLR-C 110 to the SPRS-HLR GT of SPRS hub 108 and also modifies IMSI-C to IMSI-H prior to relaying the FwdSMS message to VMSC/VLR-S 405. Finally, at steps 514 and 516, VMSC/VLR-S 405 then returns a MAP FwdSMS-ACK message to SMSC-C 118 via SPRS hub 108.

Similarly, the signal flow for MT SMS to the outbound roamer in case of the single IMSI solution for outbound roaming follows the signal flow explained above in conjunction with FIG. 5, except that the IMSI-H is replaced with the IMSI-C.

Figure 6:
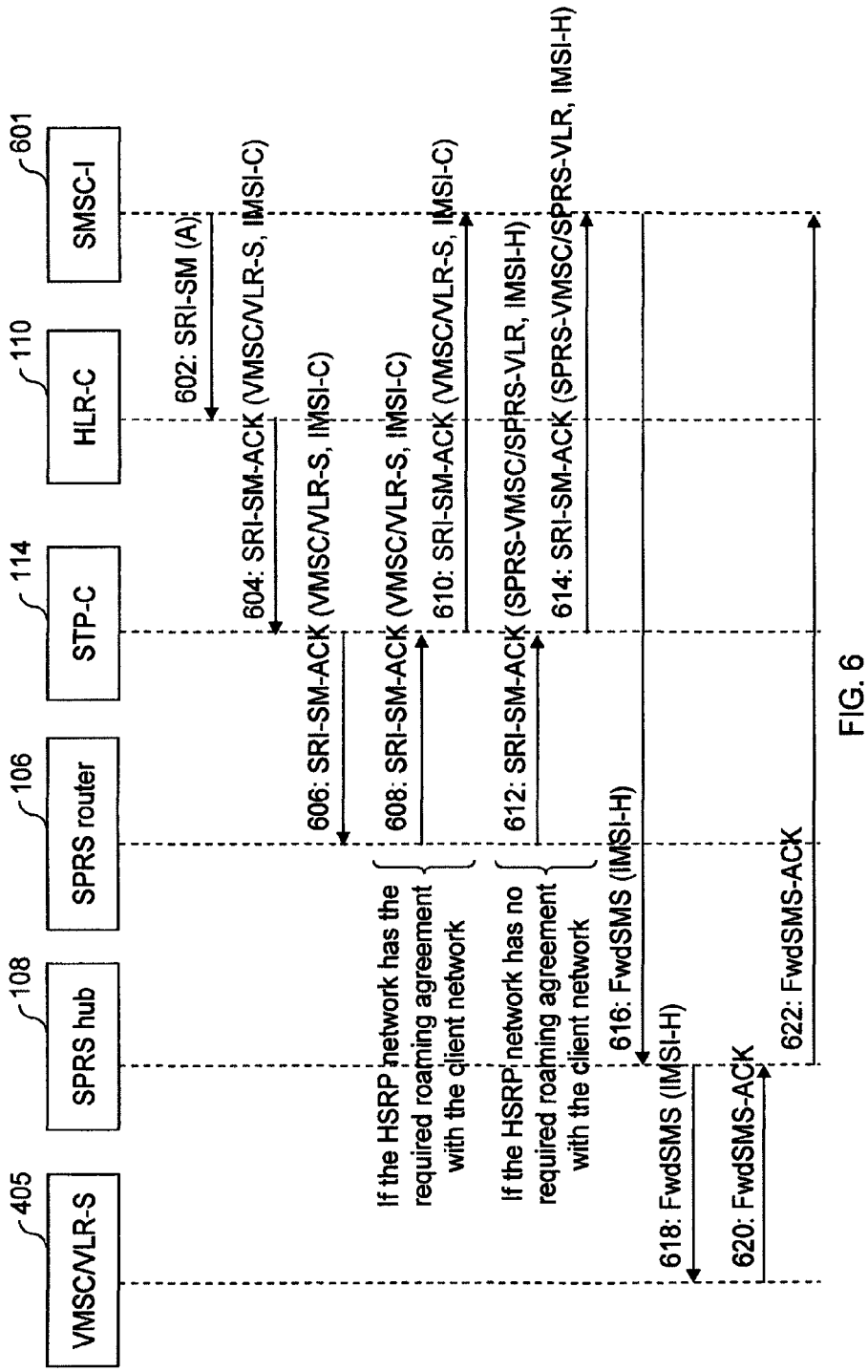
FIG. 6 represents a flow diagram for facilitating MT SMS from an interworking SMSC to the outbound roamer using the dual IMSI SIM, in accordance with a second embodiment of the present invention.

In some cases, sender B may belong to a network different from client network 102. FIG. 6 represents a flow diagram for facilitating MT SMS from an interworking SMSC 601 (hereinafter referred to as SMSC-I 601) to the outbound roamer using the dual IMSI SIM, in accordance with a second embodiment of the present invention. When SMSC-I 601 receives the MT SMS from the sender B, SMSC-I 601 issues SRI-SM (A) message to HLR-C 110, at step 602. Thereafter, HLR-C 110 returns the SRI-SM-ACK message towards SMSC-I 601. In an embodiment of the present invention, client network 102 operator configures STP-C 114 to direct all signaling messages (like SRI-SM-ACK), originating from client network 102 and destined for non-client network SMSCs, to SPRS router 106 when such non-client SMSCs have SMS interworking agreement with client network 102. Since SMSC-I 601 is a non-client network SMSC that has SMS interworking agreement with client network 102, at steps 604 and 606, STP-C 114 directs the SRI-SM-ACK message to SPRS router 106.

Thereafter, SPRS router 106 determines from the SRI-SM-ACK message whether the HSRP network has the required roaming agreement with client network 102 in a similar way as explained earlier for the PRN message (in conjunction with FIG. 4). When the SSN indicates a GSM relationship, SPRS router 106 using its database determines presence of bilateral GSM roaming relationship between the HSRP network and client network 102. In this case, SPRS router 106 bypasses the message to SMSC-I 601 without any modification and standard MT SMS flow follows. Hence at steps 608 and 610, SPRS router 106 routes the received SRI-SM-ACK message to SMSC-I 601 via STP-C 114. SMSC-I 601 then routes the MT SMS directly to VMSC/VLR-S 405.

Alternatively, in case SPRS router 106 using its database determines absence of the required GSM/GPRS/Camel/3G roaming agreement, SPRS router 106 determines host network 104's sponsorship from its database. SPRS router 106 then modifies the SRI-SM-ACK (IMSI-C, VMSC/VLR-S) message to SRI-SM-ACK (IMSI-H, SPRS-VMSC/SPRS-VLR) message, and routes the modified message to SMSC-I 601 via STP-C 114, at steps 612 and 614. VMSC/VLR-S 405 address in the SRI-SM-ACK message corresponds to the outbound roamer's current VMSC/VLR address, and SPRS-VMSC/SPRS-VLR corresponds to VMSC/VLR address associated with SPRS hub 108, in accordance with an embodiment of the present invention. Alternatively, SPRS router 106 only modifies the IMSI-C to IMSI-H in the SRI-SM-ACK message. It will be apparent to a person skilled in the art that in case of GPRS, VMSC/VLR-S 405 and SPRS-VMSC/SPRS-VLR will be replaced with the HSRP SGSN and SPRS-SGSN associated with SPRS hub 108, respectively. Further at steps 616 and 618, SMSC-I 601 forwards the MT SMS on the IMSI-H to VMSC/VLR-S 405 via SPRS hub 108. Finally at steps 620 and 622, VMSC/VLR-S 405 sends a FwdSMS-ACK message to SMSC-I 601 via SPRS hub 108.

Similarly, the signal flow for MT SMS from SMSC-I 601 to the outbound roamer in case of the single IMSI solution for outbound roaming follows the signal flow explained above in conjunction with FIG. 6, except that the IMSI-H is replaced with the IMSI-C.

Figure 7:
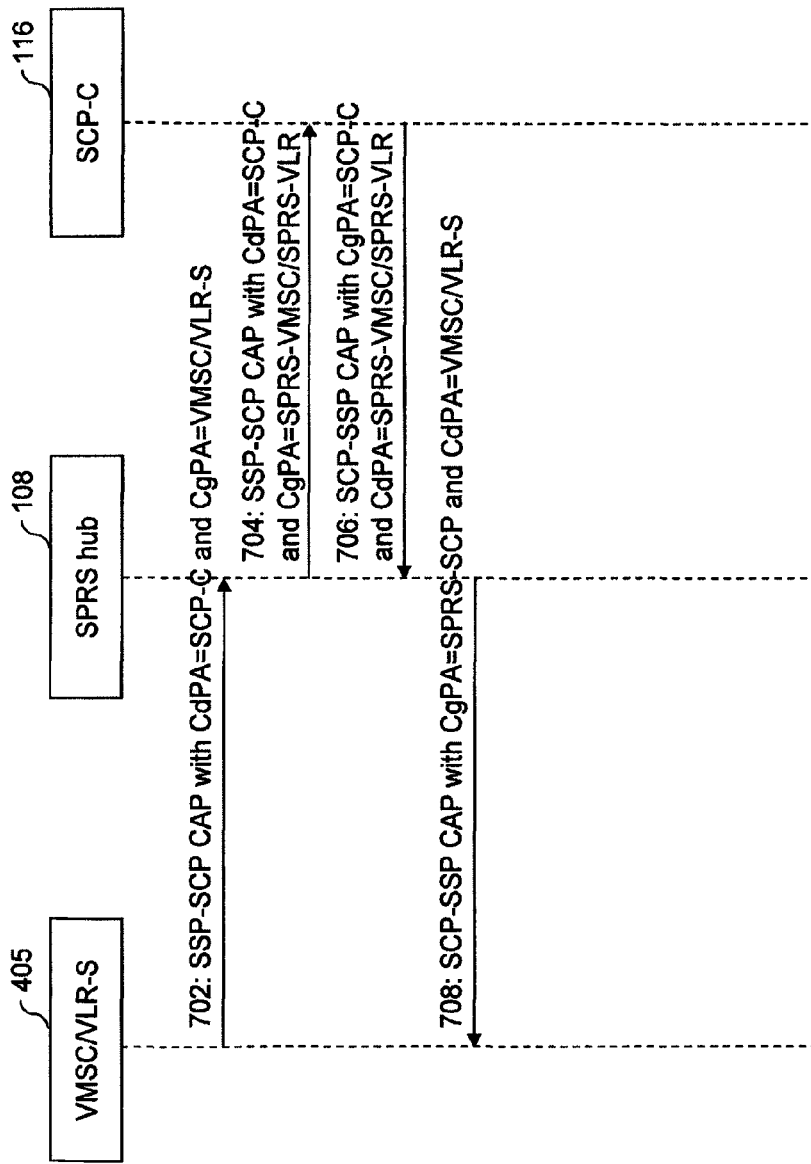
FIG. 7 represents a flow diagram for facilitating Mobile Originated (MO) Customized Applications for Mobile network Enhanced Logic (CAMEL) call or SMS or General Packet Radio Service (GPRS) by the outbound roamer using dual IMSI SIM, in accordance with an embodiment of the present invention.

Apart from MT activities, the outbound roamer in the HSRP network can also perform MO activities. FIG. 7 represents a flow diagram for facilitating MO CAMEL call or MO SMS or MO GPRS by the outbound roamer using dual IMSI SIM, in accordance with an embodiment of the present invention. When MO CAMEL call/SMS/GPRS is received at VMSC/VLR-S 405, at step 702, VMSC/VLR-S 405 sends an SSP-SCP CAP message (e.g., InitialDP (IDP), EventReport-BasicCallStateModel (ERB), and their equivalents in SMS and GPRS) to SPRS hub 108. The SSP-SCP CAP message corresponds to a CAP message that is originating from an SSP node and terminating at an SCP node. Earlier, during the registration process of the outbound roamer with the HSRP network, SPRS hub 108 has modified an SCP address in a CSI (if present) in the profile information of the ISD message to SPRS hub 108 GT (hereinafter referred to as SPRS-SCP) corresponding to SCP-C 116. Thus, when SPRS hub 108 receives the IMSI-H and SPRS-SCP parameters (if present) in the SSP-SCP CAP message, SPRS hub 108 modifies these parameters to IMSI-C and SCP-C 116, respectively, where the SCCP CgPA is modified from VMSC/VLR-S 405 address to SPRS-VMSC/SPRS-VLR (or SPRS-SGSN in case of GPRS) address. At step 704, SPRS hub 108 sends the modified SSP-SCP CAP message to SCP-C 116. SCP-C 116 then returns an SCP-SSP CAP message (e.g., Continue, Connect, ReleaseControl, Cancel and their equivalents in SMS and GPRS) to SPRS hub 108, at step 706. The SCP-SSP CAP message corresponds to a CAP message that is originating from the SCP node and terminating at the SSP node. Finally at step 708, SPRS hub 108 modifies the SCCP CgPA to SPRS-SCP and the SCCP CdPA to VMSC/VLR-S 405 and relays the modified SCP-SSP CAP message to VMSC/VLR-S 405.

The signal flow for the MO SMS by the outbound roamer in case of the dual IMSI solution for outbound roaming follows the signal flow of MO CAMEL call flow explained above in conjunction with FIG. 7, except that the SSP-SCP CAP and the SCP-SSP CAP messages are replaced with FwdSMS and FwdSMS-ACK messages, respectively. It will be apparent to a person skilled in the art that in this case of MO SMS, SCP-C 116 is replaced with SMSC-C 118.

Similarly, the signal flow for MO SMS and MO CAMEL call/SMS/GPRS by the outbound roamer in case of the single IMSI solution for outbound roaming follows the signal flow of the dual IMSI solution for outbound roaming as explained above, except that the IMSI-H is replaced with the IMSI-C. However, in an embodiment of the present invention, SPRS hub 108 does not modify the SCCP CgPA for the SSP-SCP CAP message that it receives from VMSC/VLR-S 405, and hence directly relays the SSP-SCP CAP message to client network 102. In this case, when STP-C 120 receives the SCP-SSP CAP message from SCP-C 116 that is destined for the HSRP network, STP-C 120 routes the SCP-SSP CAP message to SPRS hub 108 via SPRS router 106.

Figure 8:
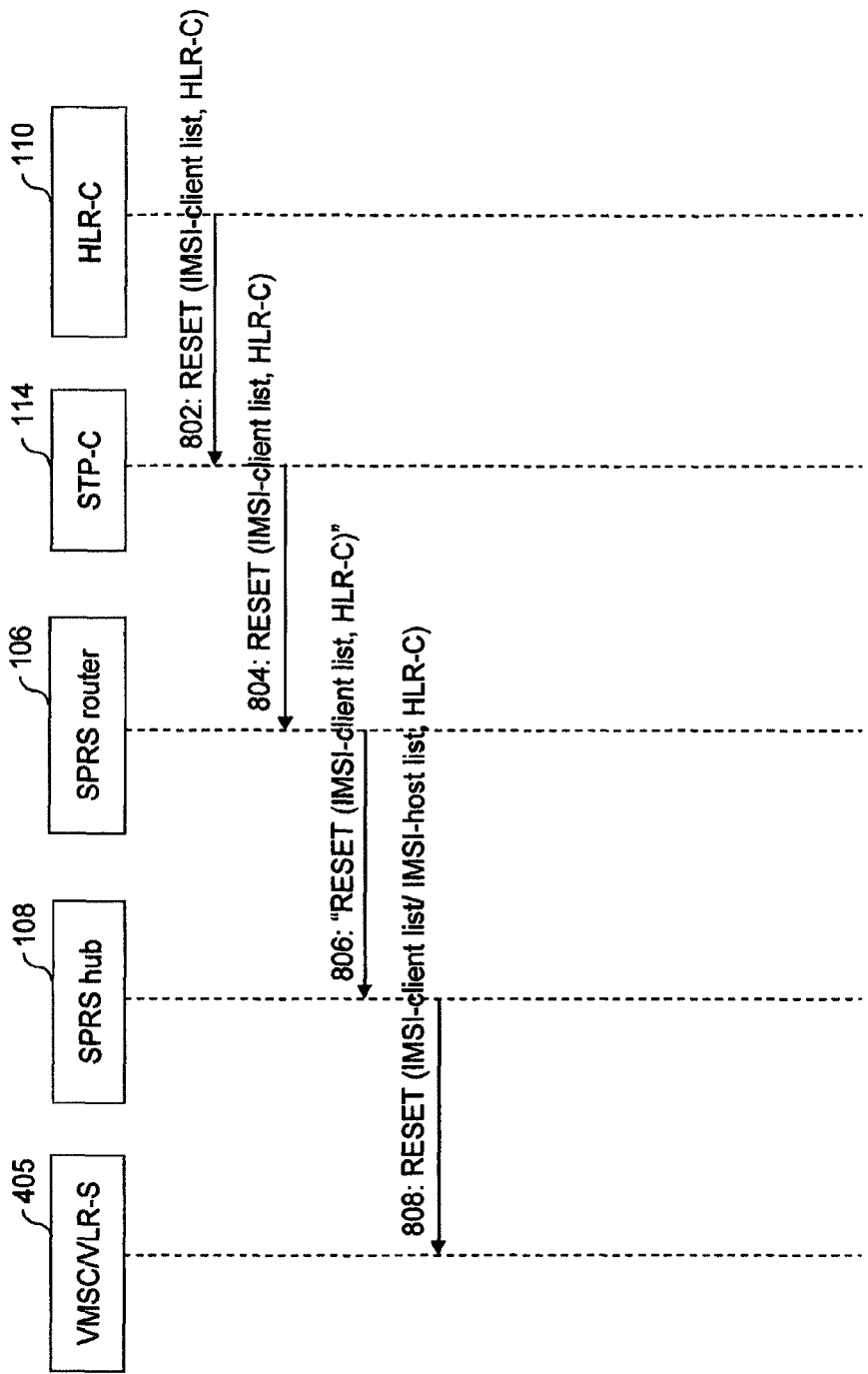
FIG. 8 represents a flow diagram of a client Home Location Register (HLR) RESET while the outbound roamer of the client network is registered with an HSRP network either using a host IMSI or a client IMSI, in accordance with an embodiment of the present invention.

Following are some common signal flows that hold for both dual IMSI and single IMSI SIM solutions. FIG. 8 represents a flow diagram of HLR-C 110 RESET while the outbound roamer of client network 102 is registered with the HSRP network either using IMSI-H or IMSI-C, in accordance with an embodiment of the present invention. At step 802, HLR-C 110 resets and hence a RESET (IMSI-client list, HLR-C) is received at STP-C 114 from HLR-C 110, where the SCCP CgPA is HLR-C 110 and the SCCP CdPA is VMSC/VLR-S 405. STP-C 114 then redirects the received HSRP network destined RESET message to SPRS router 106, at step 804. Thereafter, SPRS router 106 determines the required roaming agreement from the RESET message in a similar way as explained earlier for the PRN message (in conjunction with FIG. 4). Thus, at step 806, SPRS router 106 encapsulates the RESET message, and sends it to SPRS hub 108, when the required roaming agreement is determined to be absent. Thereafter, at step 808, SPRS hub 108 de-capsulates the RESET message, modifies SCCP CgPA from HLR-C 110 to the SPRS-HLR GT of SPRS hub 108 and also modifies IMSI-client list to IMSI-host list (i.e., in case the outbound roamer is using dual IMSI SIM) prior to relaying the RESET message to VMSC/VLR-S 405. The IMSI-host list is the list of host network 104 IMSIs that correspond to the IMSI-client list. Alternatively, in case the outbound roamer is using his client network 102 SIM, SPRS hub 108 de-capsulates the RESET message with no modification to the IMSI-client list, and sends the de-capsulated RESET message to VMSC/VLR-S 405.

Various steps in the signal flow of a standalone ISD message from HLR-C 110 to VMSC/VLR-S 405 (or the HSRP SGSN) follow that of signal flows of the RESET message explained above in conjunction with FIG. 8. The standalone ISD message corresponds to a message that HLR-C 110 sends towards VMSC/VLR-S 405 after the completion of LUP process of the outbound roamer. However, one of the following two steps will be preformed once SPRS hub 108 de-capsulates the encapsulated standalone ISD (profile) message received from SPRS router 106:

1. In case the outbound roamer is using client network 102 SIM, SPRS hub 108 sends ISD (profile') to VMSC/VLR-S 405. The profile' is the modified profile information, in accordance with an embodiment of the present invention. In one exemplary case, SPRS hub 108 can modify SCP-C 116 address in the profile information to SPRS-SCP corresponding to SCP-C 116. In another exemplary case, SPRS hub 108 modifies profile in the ISD message to replace the client APN with a host APN (corresponding to the client APN) when data connection (i.e., GPRS) between the HRSP network and client network 102 need be established via host network 104.
2. In case the outbound roamer is using dual IMSI SIM, SPRS hub 108 sends ISD (profile') to VMSC/VLR-S 405. In an exemplary case, SPRS hub 108 modifies profile in the ISD message to replace the client APN with the host APN when either the client APN has the same name as the host APN or the data connection between the HRSP network and client network 102 need be established via host network 104.

Inbound Roaming Solution

Figure 9:
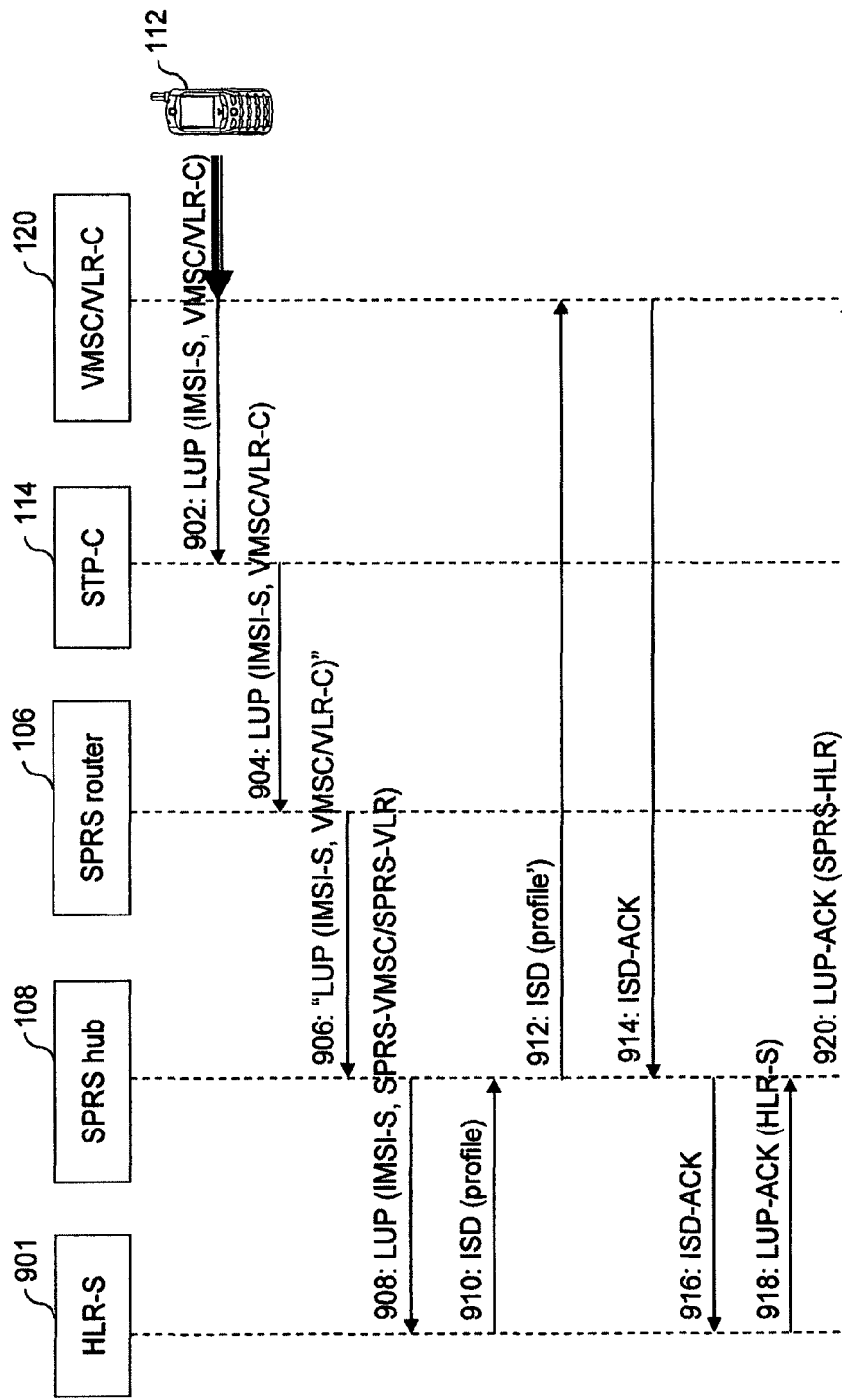
FIG. 9 represents a flow diagram for registration of the inbound roamer at the client network using an HSRP network SIM, in accordance with a first embodiment of the present invention.

This section describes signal flows for mobile communication of client network 102's inbound roamer coming from the HSRP network, where the inbound roamer uses his HSRP IMSI (hereinafter referred to as IMSI-S) to roam in client network 102. This solution is hereinafter interchangeably referred to as 'single IMSI solution for inbound roaming'. Various embodiments in the single IMSI solution for inbound roaming of the present invention to handle split roaming situation are same as the embodiments in the single IMSI solution for inbound roaming of the previous SPRS filing. We will assume in various call flows for inbound roaming that client network 102 piggybacks on host network 104's roaming relationship with the HSRP network in order to allow inbound roamers from the HSRP network to roam in client network 102. FIG. 9 represents a flow diagram for registration of the inbound roamer at client network 102 using the HSRP network SIM, in accordance with a first embodiment of the present invention. When the inbound roamer attempts to register at client network 102, VMSC/VLR-C 120 issues a LUP message on the IMSI-S towards an HLR-S 901. Since CC NDC of the SCCP CdPA (i.e., the HSRP network of VMSC/VLR-C 120) does not have the bilateral GSM/GPRS/Camel/3G roaming agreement with client network 102, STP-C 114 that receives the LUP message from VMSC/VLR-C 120 redirects the received message to SPRS router 106, at steps 902 and 904.

Thereafter, SPRS router 106 detects the inbound roamer's registration attempt at client network 102 and determines the required roaming agreement from the LUP message. Thus, at step 906, SPRS router 106 encapsulates the LUP message, and sends it to SPRS hub 108, when the required roaming agreement is determined to be absent. SPRS hub 108 then detects the inbound roamer's registration attempt at client network 102 upon receiving the encapsulated LUP message. Thereafter, at step 908, SPRS hub 108 de-capsulates the encapsulated LUP message, modifies VMSC/VLR-C MAP parameter in the LUP message to the SPRS-VMSC/SPRS-VLR GT of SPRS hub 108 and SCCP CgPA from VLR-C 120 to SPRS-VLR, prior to relaying the LUP message to HLR-S 901. HLR-S 901 then sends an ISD (profile) message back to SPRS hub 108, at step 910. In an embodiment of the present invention, SPRS hub 108 modifies the profile information in the ISD message as described earlier in case of outbound roaming solutions of the present invention. Hence, at step 912, SPRS hub 108 sends the modified profile information in the ISD message to VMSC/VLR-C 120, after either modifying the SCCP CgPA to SPRS-HLR or keeping the SCCP CgPA the same as HLR-S 901. Further at steps 914 and 916, VMSC/VLR-C 120 sends an ISD-ACK message to HLR-S 901 via SPRS hub 108. HLR-S 901 then confirms the registration of the outbound roamer by sending a LUP-ACK message with HLR-S address to SPRS hub 108, at step 918. Finally at step 920, SPRS hub 108 relays the LUP-ACK message to VMSC/VLR-C 120, where the SCCP CgPA and HLR-S address are set to SPRS-HLR or HLR-S address. It will be apparent to a person skilled in the art that in case of GPRS, VMSC/VLR-C 120 and SPRS-VMSC/SPRS-VLR will be replaced with SGSN-C 124 and SPRS-SGSN, respectively.

In an embodiment of the present invention, client network 102 operator already has GSM and GPRS roaming agreements with the HSRP network operator, however, it may require CAMEL agreement with the HSRP network operator to support CAMEL prepaid inbound roamers from the HSRP network. This can be achieved by client network 102 piggybacking on host network 104's CAMEL roaming agreement with the HSRP network. As mentioned earlier, SPRS router 106 can segregate CAP interface based on SSN of the CdPA. However CAMEL parameters can be embedded in a GSM (or GPRS) MAP transaction, and they would be removed during a GSM (or GPRS) LUP process at client network 102 when there is no bilateral CAMEL agreement between client network 102 and the HSRP network. In order to solve this problem, client network 102 operator first needs to enable CAMEL support for the inbound roamers from the HSRP network. In an embodiment of the present invention, client network 102 operator configures its STP-C 114 to route a TCAP message corresponding to the inbound roamer, to SPRS router 106 when CAMEL support for the inbound roamer is enabled and the CC NDC in the TCAP message indicates absence of CAMEL agreement between client network 102 and the HSRP network. In this case, STP-C 114 routes the TCAP message irrespective of whether client network 102 already has GSM and GPRS roaming agreements with the HSRP network.

Figure 10A:
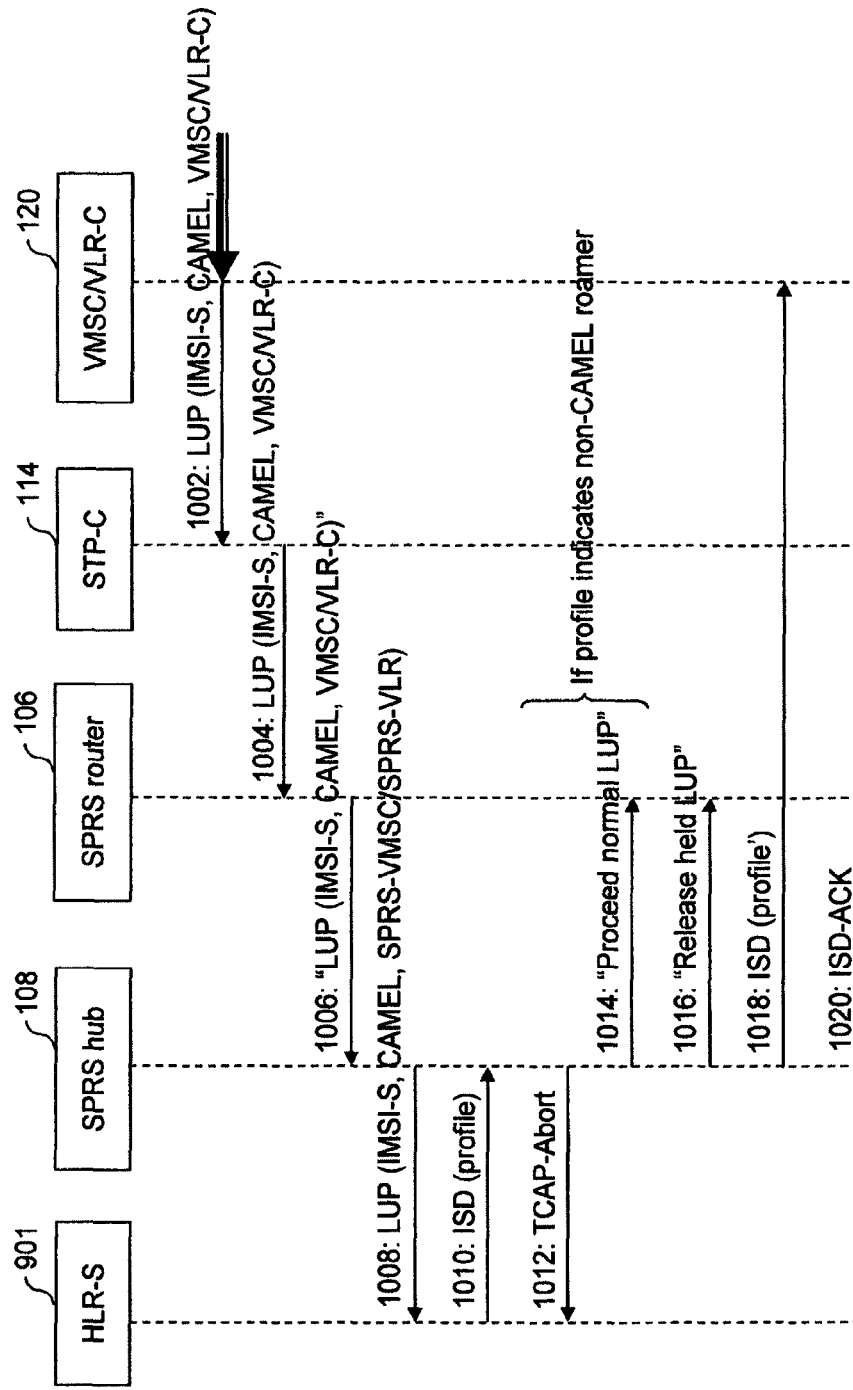
Figure 10B:
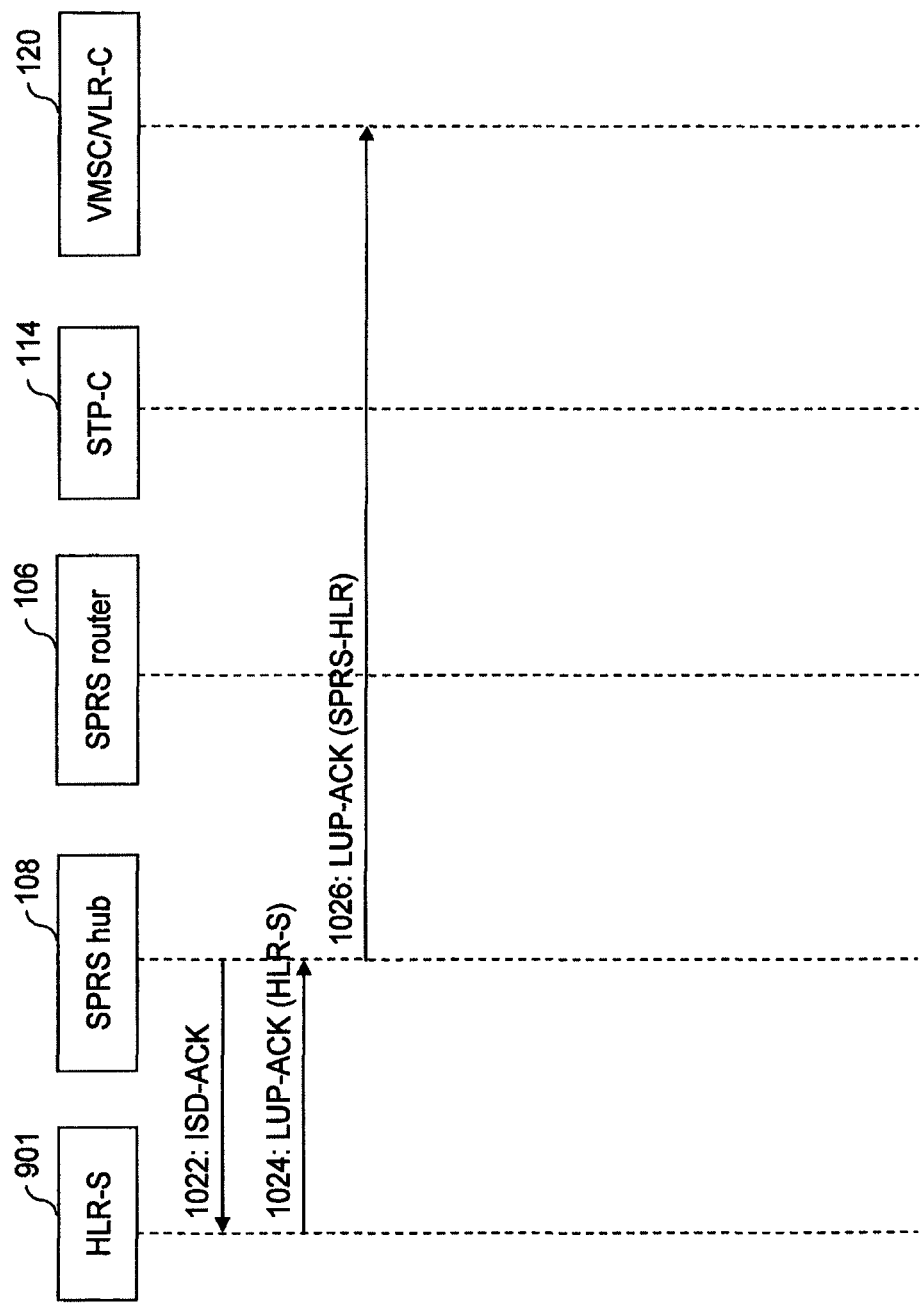

FIGS. 10A and 10B represent a flow diagram for routing the registration of the inbound roamer with CAMEL support at client network 102 to SPRS hub 108 first, in accordance with a second embodiment of the present invention. When the inbound roamer attempts to register at client network 102, VMSC/VLR-C 120 issues a LUP message on the IMSI-S with CAMEL and VMSC/VLR-C 120 address as parameters towards HLR-S 901. Steps 1002 and 1004 are same as steps 902 and 904, where STP-C 114 redirects the LUP message to SPRS router 106. However, at step 1006, SPRS router 106 detects the inbound roamer's registration attempt at client network 102, holds the LUP message (which would also include CAMEL support phases), encapsulates the LUP message, and finally sends the encapsulated LUP message to SPRS hub 108. It will be apparent to a person skilled in the art that presence of CAMEL parameters in the LUP message indicates presence of CAMEL roaming support at client network 102.

SPRS router 106 then identifies absence of required CAMEL roaming agreement between client network 102 and the HSRP network. Thereafter, at step 1008 SPRS hub 108 de-capsulates the encapsulated LUP message and sends it to HLR-S 901, and then at step 1010 HLR-S 901 returns the ISD (profile) message to SPRS hub 108. In one embodiment of the present invention, the profile information received in the ISD message at SPRS hub 108 does not contain CAMEL profile (such as CSI, etc.), i.e., the inbound roamer is not a CAMEL roamer and therefore a non-preferred roamer for client network 102 operator. In this case, SPRS hub 108 TCAP aborts the TCAP transaction with HLR-S 901. Hence at step 1012, SPRS hub 108 sends a TCAP abort message to HLR-S 901. SPRS hub 108 then informs SPRS router 106 about the abort via an encapsulation interface with SPRS router 106. In an embodiment of the present invention, host network 104 operator configures SPRS hub 108 to encapsulate SPRS router 106 destined signaling messages, such as a proceed normal LUP and a release held LUP, prior to relaying these messages to SPRS router 106. Thus at steps 1014 and 1016, SPRS hub 108 sends the "proceed normal LUP" and the "release held LUP" messages to SPRS router 106. The "proceed normal LUP" message indicates the inbound roamer as non-preferred, and thus SPRS router 106 bypasses the held LUP message (i.e., held after step 1004) to the HSRP network. This means that standard LUP process follows, where SPRS router 106 relays the held LUP message to HLR-S 901 with CgPA set as VMSC/VLR-C 120, and thereafter other registration messages (i.e., ISD, ISD-ACK and LUP-ACK) are directly exchanged between HLR-S 901 and VMSC/VLR-C 120.

However if the profile information in the ISD message (at step 1010) contains CAMEL profile, i.e., the inbound roamer is a CAMEL roamer and therefore a preferred roamer for client network 102 operator, then SPRS hub 108 informs SPRS router 106 to release the held LUP message via the encapsulation interface with SPRS router 106. This release indication allows SPRS router 106 to determine that the inbound roamer is preferred roamer, and therefore host network 104's sponsorship is required in this case. Thereafter steps 1018 to 1026 are preformed, which are same as steps 912 to 920, where ISD, ISD-ACK and LUP-ACK messages are exchanged between VMSC/VLR-C 120 and HLR-S 901 via SPRS hub 108.

Figure 11A:
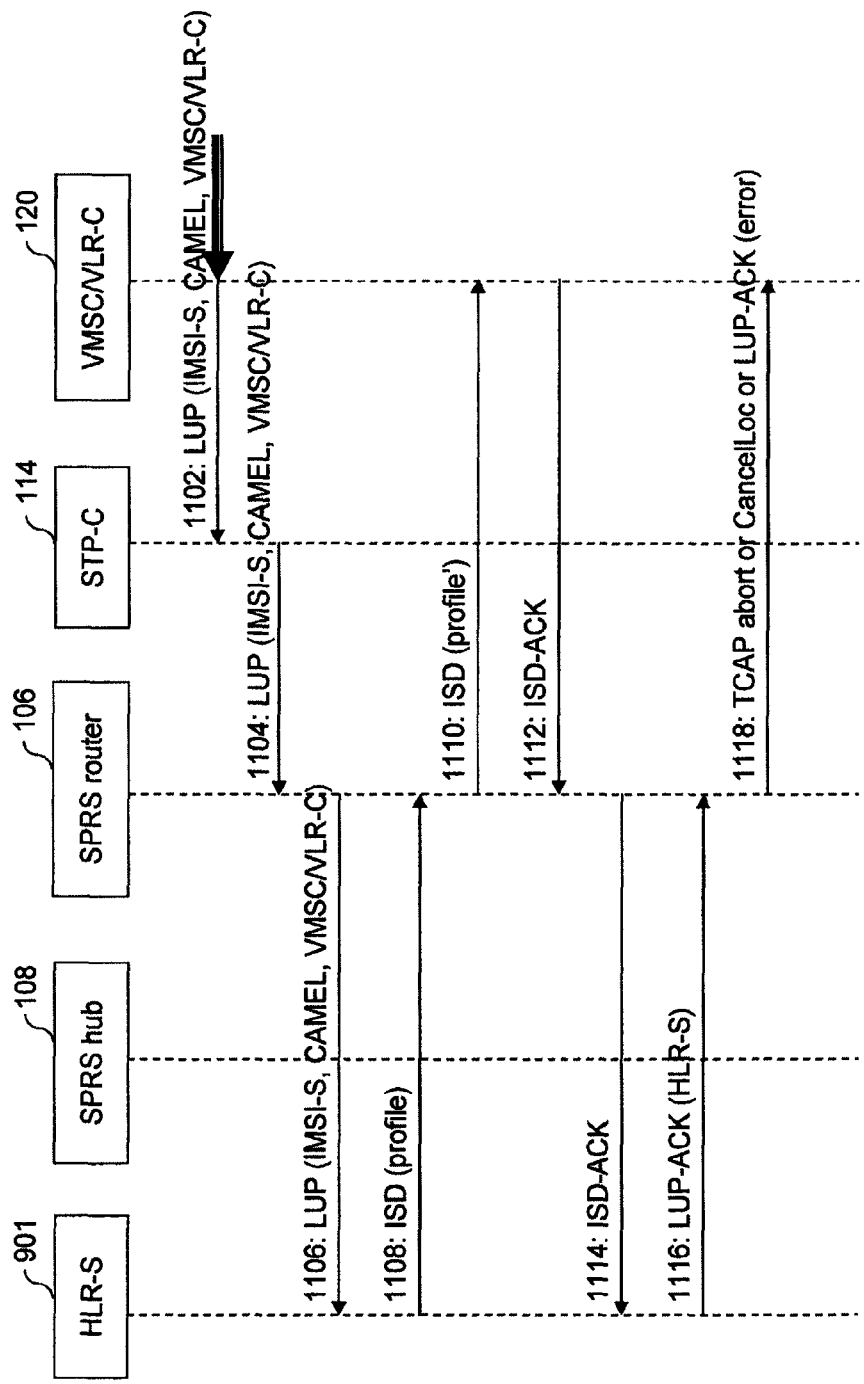
FIGS. 11A and 11B represent a flow diagram for routing the registration of the inbound roamer directly to the HSRP network first, in accordance with a third embodiment of the present invention.
Figure 11B:
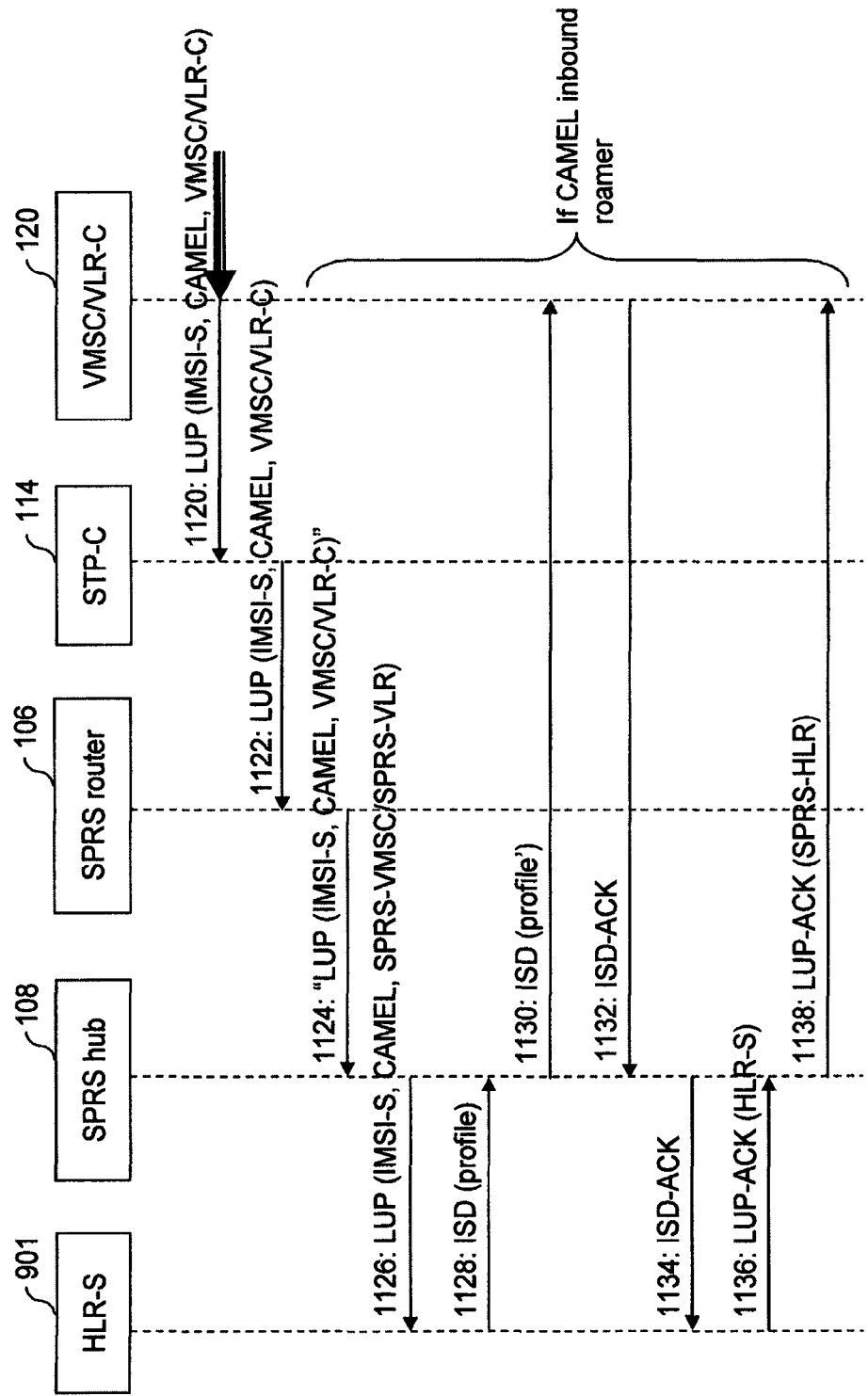

Instead of routing the LUP message through SPRS hub 108 route first and bilateral (or SPRS hub 108) route later (i.e., as done in FIGS. 10A and 10B), SPRS router 106 in an alternative method routes the LUP message through the bilateral route first and depending upon the LUP response, it then routes the SCCP signaling corresponding to the LUP process either via SPRS hub 108 or via bilateral route. FIGS. 11A and 11B represent a flow diagram for routing the registration of the inbound roamer directly to the HSRP network first, in accordance with a third embodiment of the present invention.

When the inbound roamer attempts to register at client network 102, VMSC/VLR-C 120 issues the LUP message on the IMSI-S with CAMEL and VMSC/VLR-C 120 parameters towards HLR-S 901. Steps 1102 and 1104 are same as steps 1002 and 1004, where STP-C 114 redirects the LUP message received from VMSC/VLR-C 120 to SPRS router 106. Thereafter, at step 1106, SPRS router 106 relays the received LUP message directly to HLR-S 901, after modifying the SCCP CgPA to SPRS router-VMSC/VLR address of the inbound roamer.

HLR-S 901 then returns the ISD (profile) message to SPRS router 106, at step 1108. In an embodiment of the present invention, SPRS router 106 examines the profile in the ISD message and records that the inbound roamer is not a CAMEL roamer (and hence non-preferred). In another embodiment of the present invention, SPRS router 106 examines the profile in the ISD message and records that the inbound roamer is a CAMEL roamer (and hence preferred). If preferred then at step 1110, SPRS router 106 modifies the profile information in the ISD message, and sends the modified ISD message to VMSC/VLR-C 120, after modifying the SCCP CgPA to SPRS router-HLR address of the inbound roamer. Further at steps 1112 and 1114, VMSC/VLR-C 120 returns the ISD-ACK message to HLR-S 901 via SPRS router 106. When at step 1116, SPRS router 106 receives the LUP-ACK (HLR-S) message from HLR-S 901, SPRS router 106 sends an error message, such as a TCAP abort message, or a MAP Cancel Location message, or a LUP-ACK (error) message to VMSC/VLR-C 120 in order to abort the inbound roamer's registration attempt at VMSC/VLR-C 120, at step 1118. The error sent in the LUP-ACK message is, but not limited to, System Failure (SF), Unexpected Data Value (UDV) and Missing Data (MD). This technique of aborting the registration of the roamer with client network 102 is similar to traffic redirection technique taught by the inventor of U.S. patent application Ser. No. 10/635,804, filed on Aug. 5, 2003.

It will be apparent to a person skilled in the art that a handset makes four registration attempts with a particular network, failing which it attempts to register with another network. Since the inbound roamer's handset has made only one registration attempt with client network 102, it retries another LUP attempt at client network 102. In this case, steps 1120 to 1122 (same as steps 1102 and 1104 respectively) are performed, where SPRS router 106 receives the LUP message from VMSC/VLR-C 120 via STP-C 114. In case SPRS router 106 has already determined the inbound roamer as non-preferred roamer (i.e., at step 1108), then SPRS router 106 bypasses the new LUP (i.e., subsequent LUP) message directly to HLR-S 901. Thereafter, standard LUP process follows where registration messages are exchanged directly between HLR-S 901 and VMSC/VLR-C 120. Alternatively, in case SPRS router 106 determines the inbound roamer as the preferred roamer, then steps 1124 to 1138 (same as steps 906 to 920 respectively) are performed, where the LUP message is received at HLR-S 901, which then exchanges ISD, ISD-ACK and LUP-ACK messages with VMSC/VLR-C 120 via SPRS hub 108.

In some cases, client network 102 operator may piggyback on host network 104 so as to establish CAMEL prepaid roaming with some HSRP networks. In such cases, SPRS router 106 applies logic to determine whether the CAMEL roamer is prepaid, and if so, routes the signaling of the CAMEL roamer to the HSRP network via SPRS hub 108. SPRS router 106 can apply this logic per HSRP network operator for either prepaid or postpaid or both types of CAMEL roamers. Once the type of CAMEL roamer is determined, and if the type of CAMEL roamer is not what client network 102 operator wants, then SPRS router 106 initiates the bilateral route of either the held LUP message or of the subsequent LUP message as described above. For example, in case client network 102 operator only wants prepaid CAMEL roamers, then if the CAMEL roamer is postpaid, SPRS router 106 routes the held LUP or subsequent LUP message via the bilateral route. In one embodiment of the present invention, SPRS router 106 determines whether a CAMEL roamer is prepaid or postpaid using a service key, an IMSI, an MSISDN, or an SCP address. In another embodiment of the present invention, a default type of roamer is assumed, if it is not determinable.

As described above in conjunction with FIGS. 11A and 11B, SPRS router 106 can route the registration signaling messages to the HSRP network either via bilateral route first or via SPRS hub 108 route first, and then SPRS hub 108 or bilateral route later. In this case, SPRS router 106 sends error messages (i.e., TCAP abort or CancelLoc or LUP-ACK (error)) to VMSC/VLR-C 120 and routes the subsequent LUP of the inbound roamer to the HSRP network via SPRS hub 108, when the ISD message or LUP-ACK message or Cancel Location message during the inbound roamer's first registration attempt at client network 102 indicates any of the following, but not limited to:

Roaming Not Allowed (RNA), System Failure (SF), Unexpected Data Value (UDV) and Missing Data (MD) in the LUP-ACK, or the Cancel Location message, or Roaming Restricted Due to Unsupported Feature (RRDuF) in the ISD message. For example, when the HSRP network only allows prepaid roaming in networks that have CAMEL agreement with the HSRP network and client network 102 does not have CAMEL agreement with the HSRP network, Operator Determined Barring (ODB) for MO calls by the HSRP network's inbound roamer, and Call Barring (CB) for MO calls by the inbound roamer.

The above indications allow SPRS router 106 to determine that the inbound roamer is the preferred prepaid roamer of client network 102. This determination of the preferred prepaid roamer needs to be applied with caution, since many network operators make their roamers (including postpaid) CAMEL enabled to support real time billing, Virtual Home Environment (VHE) services, fraud control, home routing, and Calling Line Identity (CLI) delivery. Client network 102 operator needs to ensure that the HSRP network provides CAMEL services to only its prepaid roamers, prior to applying this technique. In some cases, the HSRP network may even apply steering mechanism to move its outbound roamers to the networks that support CAMEL agreements with the HSRP network.

Furthermore, in an embodiment of the present invention, host network 104 operator configures its SPRS hub 108 to perform conversion of CAMEL versions (e.g., CAMEL phase I to CAMEL phase III) as the LUP message is relayed via SPRS hub 108. In this case, the CAP transactions that are relayed via SPRS hub 108 are converted to the corresponding version supported by Service Switch Function (SSF) or Service Control Function (SCF) at the HSRP network. This allows host network 104 to lead HLR-S 901 to perceive that client network 102 with which the inbound roamer is registering, has CAMEL support (with same version as that of the HSRP network) and CAMEL agreement with the HSRP network.

In an embodiment of the present invention, despite client network 102 already having bilateral GSM roaming agreements with HSRP network operators, some of these HSRP network operators may restrict certain class of outbound roamers (e.g., high end data and voice roamers in case of blackberry) from registering for the GSM roaming with client network 102 in case that class of roamers is better served by a network that has more advanced roaming agreement(s) with these HSRP networks than client network 102. In one exemplary scenario, some HSRP network operators (e.g., ATT wireless, CSL) restrict their blackberry subscribers to register with a GSM network (even with a manual selection of the GSM network, e.g., at China Unicorn) that has no GPRS roaming agreement with them. In another exemplary scenario, some other HSRP network operators (e.g., European operators) restrict their CAMEL prepaid subscribers to register with the GSM network (even with a manual selection) that has no CAMEL agreement with them. As a result, such GSM network operators lose some classes of roamers. In fact, these GSM network operators may possibly end up losing majority of its subscriber base of prepaid roamers from the HSRP network operators.

In order to solve the above mentioned problems, client network 102 operator detects (e.g., via monitoring) or knows in advance that the HSRP network sends RNA to client network 102 for a class of roamers from the HSRP network due to absence of the required roaming agreement (e.g., GPRS or CAMEL), in accordance with an embodiment of the present invention. In this case, client network 102 operator configures its STP-C 114 to route SCCP E.214 signaling message (e.g., LUP), destined for the HSRP network, to SPRS router 106, when the HSRP network applies traffic steering (e.g., by sending RNA to client network 102 in response to the LUP attempt at client network 102) on some class of roamers attempting to register with client network 102. This traffic steering allows the HSRP network operator to restrict such class of roamers to register with client network 102 by redirecting them away from client network 102. This case considers the inbound roamer from the HSRP network as one such class of roamer.

Thus, when the inbound roamer attempts to register with client network 102, STP-C 114 redirects the LUP message destined for the HSRP network and received from VMSC/VLR-C 120, to SPRS router 106. Thereafter, SPRS router 106 holds the received LUP message with its own GT as CgPA even though a GSM bilateral agreement is present between client network 102 and the HSRP network. As described above in conjunction with FIGS. 10A and 10B, and FIGS. 11A and 11B, SPRS router 106 then routes the encapsulated LUP message to the HSRP network either directly or via SPRS hub 108. Further, if the LUP response is RNA (i.e., the inbound roamer may be redirected away from client network 102), then SPRS router 106 either directs the held LUP message to the HSRP network via SPRS hub 108, or it sends a LUP reject message with a non-RNA error (e.g., SF, UDV or CancelLoc) to VMSC/VLR-C 120 so as to cause the inbound roamer's mobile device to try another LUP attempt at client network 102. In the latter case, SPRS router 106 directs the subsequent LUP message to the HSRP network via SPRS hub 108.

Since client network 102 is not sure about the reason for the RNA, in accordance with an embodiment of the present invention, SPRS router 106 selects a list of SPRS hubs for routing the signaling messages of the inbound roamer (such as LUP message), when multiple SPRS hubs are available. In an embodiment of the present invention, SPRS router 106 attempts this routing of the singling messages to multiple SPRS hubs until either an SPRS hub from these multiple hubs completes registration of the inbound roamer with client network 102 or all SPRS hubs fail to complete the inbound roamer's registration with client network 102. In the former case, SPRS router 106 stores the successful SPRS hub for routing subsequent signaling messages of the inbound roamer to this SPRS hub. In an embodiment of the present invention, SPRS router 106 directs the inbound roamer's signaling via the successful hub for a configurable time period that is defined by client network 102 operator. In the latter case, SPRS router 106 stores the inbound roamer as non-preferred, and therefore relays the RNA response received in the next LUP response to VMSC/VLR-C 120. In an embodiment of the present invention, SPRS router 106 relays all future RNA response to the inbound roamer's LUP attempt at client network 102, to VMSC/VLR-C 120 for a configurable time period that is defined by client network 102 operator.

In some cases, the HSRP network operator applies Steering of Roaming (SoR) techniques to redirect roamers attempting to register with client network 102 to preferred networks despite there being a bilateral GSM agreement between client network 102 and the HSRP network. As a result, client network 102 operator, which becomes a non-preferred visited network operator for the HSRP network operator, loses roaming revenue from the roamers coming from the HSRP network. Therefore, in order to solve this problem, client network 102 operator applies an anti-SoR technique to counter the SoR by the HSRP network, without violating GSMA's BA 30 and IR.73 guidelines which do not allow a visited network operator to apply counter measures to defeat the SoR directly. In this anti-SoR technique, SPRS router 106 applies logic similar to that explained above for class of roamers. Similarly, the technique for handling roamers from the HSRP network that are SoRed with a non-RNA error (e.g., SF, UDV, CancelLoc, etc.) is same as above mentioned technique of split roaming for the class of roamers.

Furthermore, various steps in the signal flow for the registration process of the inbound roamer with 3G support at client network 102 are same as the registration process signal flow of the inbound roamer with CAMEL support at client network 102 as described earlier in conjunction with FIGS. 10A and 10B. In this case of the inbound roamer with 3G support, client network 102 operator configures its STP-C 114 to route a TCAP message corresponding to the inbound roamer, to SPRS router 106 when the inbound roamer's 3G support is enabled and the CC NDC in the TCAP message indicates absence of 3G agreement between client network 102 and the HSRP network. In this case, STP-C 114 routes the TCAP message to SPRS router 106 irrespective of whether client network 102 already has GSM and GPRS roaming agreements with the HSRP network. Also, SPRS hub 108 determines whether the inbound roamer is 3G roamer using profile information in the ISD message (i.e., the inbound roamer is 3G roamer if the profile information contains 3G profile like Bearer Services (BS) 30), as done for CAMEL roamer that is described earlier in conjunction with FIGS. 10A and 10B).

Moreover, the inbound roamer in client network 102 can also receive calls and SMS while being registered with client network 102. The signal flow of the inbound roamer's MT call and MT SMS follows the corresponding MT call and MT SMS signal flow explained in the previous SPRS filing, where the SPRS node of the previous SPRS filing functions similar to SPRS hub 108.

Figure 12:
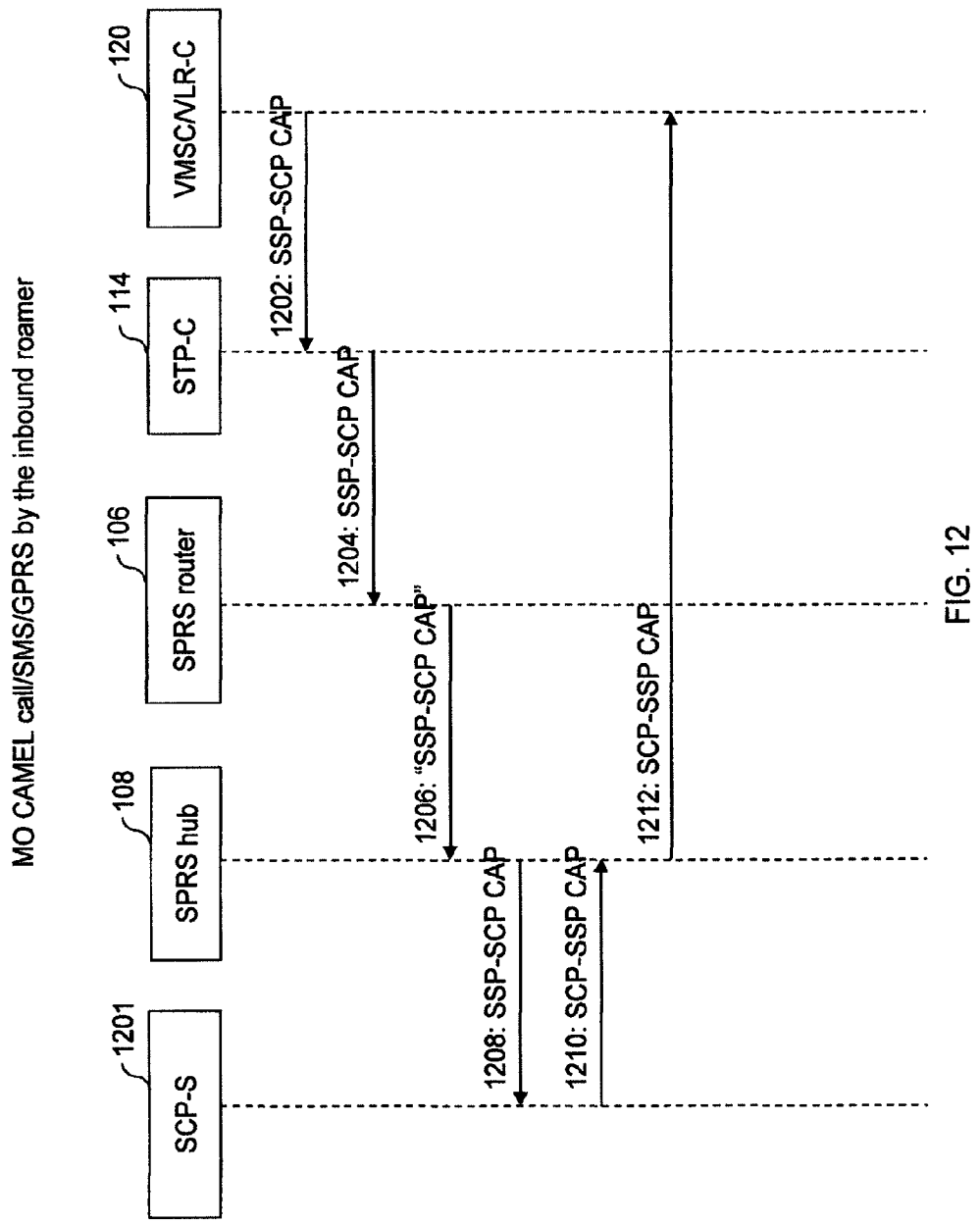
FIG. 12 represents a flow diagram for facilitating MO CAMEL call or MO SMS or MO GPRS by the inbound roamer in the client network, in accordance with an embodiment of the present invention.

Apart from MT activities, the inbound roamer in client network 102 can also perform various MO activities. FIG. 12 represents a flow diagram for facilitating MO CAMEL call/SMS/GPRS by the inbound roamer in client network 102, in accordance with an embodiment of the present invention. When MO CAMEL call/SMS/GPRS is received at VMSC/VLR-C 120, VMSC/VLR-C 120 sends the SSP-SCP CAP message with SCCP CdPA of an SCP associated with the HSRP network (hereinafter referred to as SCP-S 1201). Since CC NDC of the SCCP CdPA (i.e., the HSRP network of SCP-S 1201) does not have the bilateral GSM/GPRS/Camel/3G roaming agreement with client network 102, STP-C 114 that receives the LUP message from VMSC/VLR-C 120 redirects the received message to SPRS router 106, at steps 1202 and 1204. Thereafter, SPRS router 106 determines the required roaming agreement from the SSP-SCP CAP message. Thereafter, at step 1206, SPRS router 106 encapsulates the SSP-SCP CAP message, and sends it to SPRS hub 108, when the required roaming agreement is determined to be absent.

Further at step 1208, SPRS hub 108 de-capsulates the "SSP-SCP CAP" message, and modifies the SCCP CgPA from VMSC/VLR-C 120 to SPRS-VMSC/SPRS-VLR, prior to relaying the SSP-SCP CAP message to SCP-S1201. SCP-S1201 then sends the SCP-SSP CAP message to SPRS hub 108, at step 1210. Finally, at step 1212, SPRS hub 108 relays the received SCP-SSP CAP message to VMSC/VLR-C 120, after modifying the SCCP CgPA to SPRS-SCP.

The signal flow for the MO SMS by the inbound roamer follows the signal flow that of MO CAMEL explained above in conjunction with FIG. 12, except that the SSP-SCP CAP and the SCP-SSP CAP messages are replaced with FwdSMS and FwdSMS-ACK messages, respectively. It will be apparent to a person skilled in the art that in this case of MO SMS, SCP-S1201 is replaced with an SMSC associated with the HSRP network.

Furthermore, the GPRS activation and PDU transfer signal flow in case of the dual IMSI solution for outbound roaming and single IMSI solution for inbound roaming (both subscriber and network initiated) follows the signal flow of the corresponding solutions of the previous SPRS filing. Also, the GPRS activation and PDU transfer signal flow for the single IMSI solution for outbound roaming (both subscriber and network initiated) follows the signaling flow of the dual IMSI solution for outbound roaming of the previous SPRS filing. However, in the single IMSI solution for outbound roaming of the present invention, the host APN and the IMSI-H is replaced with the client APN and the IMSI-C, respectively.

Billing

The billing process of split roaming involves split Call Detail Record (CDR) for Transferred Account Procedure (TAP) processing. In order to handle inbound roamers of client network 102, client network 102 operator separates CDRs for direct bilateral roaming agreements from the CDRs for client network 102 operator's required roaming agreements, i.e., host network 104 sponsored agreements. Client network 102 operator distinguishes different CDR types by their corresponding markers, e.g., GPRS by GPRS fields (e.g., APN, SGSN, etc.), CAMEL by CAMEL fields (e.g., CAMEL connected number, CAMEL support phase, etc.), 3G by 3G fields (e.g., BS 30 in bearer information). Client network 102 operator then sends CDRs for the direct bilateral roaming agreements to a TAP processor via a bilateral Inter Operator Tariff (IOT) using the HSRP network operator's Transferred Account Data Interchange Group (TADIG) code and client network 102 operator's TADIG code. However, client network 102 operator sends CDRs for client network 102 operator's required roaming agreements to the same TAP processor via different IOT arranged by the HSRP network operator. Moreover, in this case of required roaming agreements, host network 104 and client network 102 operators use the HSRP network and client network 102 operators' TADIG codes (client network 102's TADIG code is usually different from the standard TADIG code) for the piggyback purpose.

Alternatively, following GSMA's BA 21 standard this IOT can be that of host network 104 operator with respect to the HSRP network operator or that of client network 102 operator. The piggybacked TAP files of different host networks are then sent to their respective host networks, which then send these files to the HSRP network operators. The HSRP network operators pay revenue to the host network operators who finally pay the revenue to client network 102 operator. In this inbound roaming scenario, host network operators bear the fraud liability (e.g., high usage report) for client network 102 operator.

Furthermore, in accordance with an embodiment of the present invention, where client network 102 already has a direct GSM bilateral roaming relationship with the HSRP network operator, instead of sending the TAP files via host network 104, client network 102 operator directly sends these files to the HSRP network operator, provided both the HSRP network and host network 104 operators agree to such an arrangement.

In order to handle billing for outbound roamers of client network 102, the HSRP network operator sends these outbound roamers' TAP records to the host networks identified by IMSIs of these roamers. Since such TAP records are mixed with the host networks' normal outbound roamers' TAP records, these host network operators split their TAP records based on the IMSI ranges used for each client network, and then send them in separate files to client network 102 operator. In this case, client network 102 operator pays the revenue to the host network operators, and these host network operators further pay the revenue to the HSRP network operator. In an embodiment of the present invention, the host network operators have the financial liability to the HSRP network operator, irrespective of whether client network 102 operator paid the revenue to these host network operators.

Open Connectivity (OC)

GSMA and network operators' community has promoted Open Connectivity Initiative (OCI) as a cost effective and efficient way for network operators to establish or extend their roaming relationships. In this model, the network operators would, in effect, "outsource" their roaming operations to a hub operator. Although each network operator would require only a single agreement with such an outsourced hub operator, that hub operator would still responsible for bilateral IOT, IREG and TADIG tests, signaling and clearing with each participating network operator. Although OCI may not currently require supporting the piggyback technique (explained in the previous SPRS filing and various embodiments of the present invention) or a broker model (where a broker acts as a mediator between network operators to settle roaming IOT with these network operators), implementating OCI also does not seem exclude these models.

Various embodiments of the split roaming scenarios for piggyback roaming can also be similarly applied to the OCI environment for differentiated routing of signaling messages between OC supported roaming agreements and bilateral roaming agreements. Host network 104 described earlier in various embodiments of the present invention would function as an OC hub rather than a network operator. This OC hub would not have any bilateral roaming agreements with the HSRP networks; rather it would facilitate or perform under the roaming agreement between different network operators (e.g., between client network 102 and the HSRP network). However, in this case of OC hub, possibly only single IMSI solution for both inbound and outbound would be applicable.

Furthermore, like one host network piggybacks another host network in a cascaded manner, OC hubs can also be cascaded to establish roaming relationship between two client network operators supported by their respective SPRS hubs.

In an embodiment of the present invention, client network 102 operator of the OC hub deploys SPRS router 106 in its network. In another embodiment of the present invention, SCCP carrier of client network 102 deploys SPRS router 106 in its network. In yet another embodiment of the present invention, the OC hub of client network 102 deploys SPRS router 106 in its network. In this embodiment, the OC hub can configure its STP to route all SCCP signaling messages to SPRS router 106 first. Thereafter, SPRS router 106 decides the splitting of the SCCP signaling in a similar manner as described earlier for inbound and outbound roaming solutions of the present invention. Also, similar to host network 104 operator, the OC hub deploys SPRS hub 108 in its network, in accordance with an embodiment of the present invention. In another embodiment of the present invention, the OC hub could deploy SPRS hub 108, optionally integrated with SPRS router 106, in its network.

It will be apparent to a person skilled in the art, that the roaming service using the split roaming scenarios described above can also be applied to Code Division Multiplexed Access (CDMA)/American National Standards Institute #41 (ANSI-41), other technologies such as, but not limited to, VoIP, WiFi, 3GSM and inter-standard roaming. For example, a CDMA roaming subscriber traveling with an HPMN CDMA handset. Another example is a CDMA roaming subscriber traveling with an HPMN GSM SIM and a GSM handset. Yet another example is a GSM roaming subscriber traveling with an HPMN CDMA RUIM and a CDMA handset. It would be obvious to a person skilled in the art that these two interfaces in different directions may not have to be the same technologies. In addition, there could be multiple types of interfaces in both directions.

An exemplary list of the mapping between GSM MAP and ANSI-41 is described in the table below as a reference.

| GSM MAP | ANSI 41D |
| --- | --- |
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

A client network operator uses one or more variations of the present invention to piggyback on one or more host networks' roaming relationships (such as GSM, GPRS, CAMEL or 3G) with one or more HSRP networks, in order to cater its inbound and outbound roamers, when the client network does not posses these roaming relationships with the HSRP networks. This is beneficial for new or established client networks that have limited roaming agreements, as they can extend their roaming coverage using one or more embodiments of the present invention. Since the present invention provides a piggyback split roaming solution, it cuts down the cost of establishing time consuming and costly direct roaming agreements between the client and the HSRP network. This increases roaming revenue for the client network operator as the operator gets more inbound roamers to register with its network. Also, the client network is able to provide better roaming coverage (e.g., if only GSM roaming agreement exists, CAMEL roaming coverage is provided by piggybacking) to its outbound roamers. Additionally, it also benefits the host networks and HSRP networks as their outbound roamers are able roam in the client network, and also they are able to cater to inbound roamers coming from the client network. Further, the present invention also allow the client network to counter any traffic redirection mechanism that may be applied by the HSRP networks to its move outbound roamers away from the client network. The client network can also determine whether the inbound roamer from a particular HSRP network is preferred roamer (e.g., prepaid roamer or CAMEL roamer or 3G roamer), and if the inbound roamer is determined to be preferred, then the client network uses various embodiments of the present invention to cater to the preferred inbound roamer.

Advanced Services Working in Concert with Split Roaming

To be sure, a client network operator stands to benefit by offering split roaming under the present invention, insofar as it is able to sell additional sorts of telecommunications services (data, or CAMEL roaming for data and voice) by virtue of piggybacking on the host network operator's relationships with HSRPs. But it can even further enhance the benefit, even in an Open Connectivity scenario, by offering those inbound and outbound roamers a number of advanced value-added services aimed at encouraging further roaming usage.

Additionally, split roaming for data (such as 3G/WCDMA, Edge or GPRS) can encourage inbound "smart phone" roamers to utilize the client network. A "smart phone" is a mobile handset that, in addition to offering voice calls, enables a user to interact with other data services, and normally a smart phone is capable of storing and operating a variety of computer programs installed and configured on demand. Examples of smart phones are Blackberry handsets, Palm Treo, iPhone by Apple, LG Voyager, and a variety of handsets offered by the other major handset providers. Smart phones are often costlier than normal phones. Often, smart phone users are the type of travelers who are likely to use telecommunications services more readily when they travel.

Part of the benefit of split roaming for data-roaming-agreements can occur automatically, in the case of smart phones that are configured to prefer roaming on visited networks that offer data coverage.

But a client network under the present invention, or a host network, can further enhance the potential increase in roaming usage by offering actual advanced value added services of special interest to smart phone users and non-voice-data-roamers. Examples include offering Blackberry server services for inbound roamers using RIM handsets, or newly proposed iPhone push-email or business services for inbound roamers using iPhones, or other similar services for inbound roamers possessing certain other types of customer equipment. Another embodiment is for the client network to offer inbound data roamers, or the host network to offer outbound data roamers, so-called "Roaming Content Portal" products, in which the applicable network would identify roamers by home network and visited location, and offer data and media services relevant to their current location, but in their own home language.

Similarly, client and host networks under the present invention can enhance the benefit of offering split-roaming for CAMEL by offering advanced services of special interest to pre-paid roamers. Examples include offering prepaid roamers a local number within their visited location, which would be billed to their prepaid account back home. Or for all roamers, offering such a local number free of charge, whereby they would receive incoming local calls for free, either to encourage them to use their phones while traveling for outbound calls, or as a reward for purchasing other services while roaming, such as prepaid roaming.

And a client network or host network operator under the present invention can also enhance the benefit of any of the piggyback roaming or OC embodiments by offering a variety of value added services generally designed to encourage roaming. Examples include so-called "virtual home environment" products, which permit roamers to dial phone numbers according to the numbering and short code plans of their home location and permits caller I.D. to be delivered to their roaming handsets, and permits voice mails to be deposited and retrieved. Steering of Roaming or so-called traffic management services permit the client or host network to achieve synergies by apportioning outbound or inbound roaming traffic to the networks with whom they have arranged favorable rates.

All of these types of advanced services, can help client and host networks to enhance the benefit of operating a piggyback roaming or OC embodiment of the present invention, and can also bring roamers enhanced benefit under the present invention.

The present invention can take the form of an entirely hardware embodiment, an entirely software embodiment, or an embodiment containing both hardware and software elements. In accordance with an embodiment of the present invention, the invention is implemented in software, which includes but is not limited to firmware, resident software, microcode, etc.

Furthermore, the invention can take the form of a computer program product, accessible from a computer-usable or computer-readable medium, providing program code for use by, or in connection with, a computer or any instruction execution system. For the purposes of this description, a computer-usable or computer readable medium can be any apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CDROM), compact disk-read/write (CD-R/W), and Digital Versatile Disk (DVD).

A computer usable medium provided herein includes a computer usable program code, which when executed, facilitates exchange of signaling messages between a client network and an HSRP network, for providing roaming services to inbound and outbound roamers of the client network, despite both networks not having a direct roaming agreement. In order to do so, the client network uses an SPRS router to exchange signaling messages of these roamers with the HSRP network via one or more SPRS hubs. The computer program product further includes a computer usable program code for identifying one or more parameters in the signaling messages received at the SPRS router so as to determine from the parameters one or more roaming agreements that are required between the client network and the HSRP network to allow exchange of the signaling messages between the client network and the HSRP network. The computer program product further includes a computer usable program code for facilitating by the SPRS router, exchange of the signaling messages between the client network and the HSRP network via the SPRS hubs, when the SPRS router determines absence of the required roaming agreements. The computer program product further includes a computer usable program code for facilitating by the SPRS router, direct exchange of the signaling messages between the client network and the HSRP network, when the SRPS router determines presence of the required roaming agreements.

The components of the present two-node SPRS described above include any combination of computing components and devices operating together. The components of the present two-node SPRS can also be components or subsystems within a larger computer system or network. The present two-node SPRS components can also be coupled with any number of other components (not shown), for example, other buses, controllers, memory devices, and data input/output devices, in any number of combinations. In addition, any number or combination of other processor-based components may be carrying out the functions of the present two-node SPRS.

It should be noted that the various components disclosed herein may be described using computer aided design tools, and/or expressed (or represented) as data and/or instructions, embodied in various computer-readable media, in terms of their behavioral, register transfer, logic component, transistor, layout geometries, and/or other characteristics. Computer-readable media, in which such formatted data and/or instructions may be embodied, include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole, and not to any particular portions of this application. When the word "or" is used in reference to a list of two or more items, that word covers all of the following interpretations of the word: any of the items in the list, all of the items in the list, and any combination of the items in the list.

The above description of illustrated embodiments of the present two-node SPRS is not intended to be exhaustive or to limit the system to the precise form disclosed. While specific embodiments of, and examples for, the present two-node SPRS are described herein for illustrative purposes, various equivalent modifications are possible within the scope of the present two-node SPRS, as those skilled in the art will recognize. The teachings of the present two-node SPRS provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for facilitating exchange of one or more signaling messages between a client network and an HSRP network. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the two-node SPRS of the present invention detailed in the illustrative examples contained herein are described using terms and constructs drawn largely from GSM mobile telephony infrastructure. However, use of these examples should not be interpreted as limiting the invention to those media. The two-node SPRS and method can be of use and provided through any type of telecommunications medium, including without limitation: (i) any mobile telephony network including without limitation GSM, 3GSM, 3G, CDMA, Wimax, VoIP, HSDPA, SIP, IMS, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from think; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

Technical References
AA 13—Common Annex for all roaming partners
AA 14—Individual Annex for a roaming partner
AA 19—SMS interworking agreement with a roaming partner
AA 31—GPRS roaming agreement with a roaming partner
GSM 902 on MAP specification
Digital cellular telecommunications system (Phase 2+)
Mobile Application Part (MAP) Specification
(3GPP TS 09.02 version 7.9.0 Release 1998)
GSM 340 on SMS
Digital cellular telecommunications system (Phase 2+)
Technical realization of the Short Message Service (SMS)
(GSM 03.40 version 7.4.0 Release 1998)
GSM 378 on CAMEL
Digital cellular telecommunications system (Phase 2+);
Customized Applications for Mobile network Enhanced Logic (CAMEL) Phase 2;
Stage 2
(GSM 03.78 Version 6.7.0 Release 1997)
GSM 23078 CAMEL 3GPP standard
GSM 978 on CAMEL Application Protocol
Digital cellular telecommunications system (Phase 2+);
Customized Applications for Mobile network Enhanced Logic (CAMEL);
CAMEL Application Part (CAP) specification
(GSM 09.78 version 7.1.0 Release 1998)
GSM 29002 Signalling procedures and the Mobile Application Part (MAP) (Release 1999) 3GPP standard
GSM 360 on GPRS,
GSM 23060 on GPRS R99,
GSM 960 on GPRS GTP 0,
GSM 29060 on GPRS GTP 1,
GSM 379 on CAMEL Support of Optimal Routing,
GSM 318 on CAMEL Basic Call Handling,
GSM 320 Security related network functions
GSM 23012 Location Management
IR 21—International Roaming exchange of network information for roaming partners
Q1214-Q1218 on Intelligent Networks,
Q701-704 on SS7 MTP,
Q711-Q714 on SS7 SCCP,
Q760-Q769 on SS7 ISUP
Jiang 2003 SIMM: Providing Multiple MSISDNs in a SIM with a single IMSI for multiple roaming partners
Jiang 2003 MIMM/MISM: Providing Multiple/Single MSISDNs and Multiple IMSIs in a SIM for multiple roaming partners
Jiang 2007 SIMM Variation: Method and System for Multiple MSISDNs in a SIM with a single IMSI for multiple roaming partners without changing SIM
Jiang 2007 Multiple SIMs: Method and system for Multiple MSISDNs with multiple SIMs for multiple roaming partners
Jiang et al 2003 TR: Cellular Traffic Redirection
Jiang 2006 IR 73 TR: IR 73 Compliant passive traffic steering
Jiang 2005 DCG-O: Dynamic Camel Gateway for outbound roamers
Jiang 2005 DCG-I: Dynamic Camel Gateway for inbound roamers
Jiang 2007 Passive Inbound: A passive monitoring-based method and system for providing mobile inbound roaming communication corresponding to multiple MSISDNs associated with a single IMSI for multiple roaming partners
Joss Marcel and Werner Hirzel 2004: Signaling method and conversion device for telecommunications networks, U.S. Pat. No. 6,684,073 B1, issued on 27 Jan. 2004
Open Connectivity, GSMA OC-18 related initiatives, 2007

| APPENDIX | |
|---|---|
| Acronym | Description |
| 3G | Third generation of mobile |
| AA | International Roaming Agreement |

APPENDIX

| Acronym | Description |
| --- | --- |
| ANSI-41 | American National Standards Institute #41 |
| BARG | Billing Accounting and Roaming Group |
| BA | BARG |
| CAMEL | Customized Application for Mobile Enhanced Logic |
| CAP | Camel Application Part |
| CB | Call Barring |
| CC | Country Code |
| CdPA | Called Party Address |
| CgPA | Calling Party Address |
| CSI | Camel Subscription Information |
| ERB | CAP Event Report Basic call state model |
| GMSC | Gateway MSC |
| GMSC-C | GMSC in client network |
| GMSC-H | GMSC in host network |
| GPRS | General Packet Radio System |
| GSM | Global System for Mobile communication |
| GSMA | GSM Association |
| GT | Global Title |
| HLR | Home Location Register |
| HLR-C | Client network HLR |
| HLR-H | Host network HLR |
| HPMN | Home Public Mobile Network |
| HSRP | Host Supported Roaming Partner |
| IAM | Initial Address Message |
| IDP | Initial DP IN/CAP message |
| IMSI | International Mobile Subscriber Identity |
| IMSI-C | Client network IMSI |
| IMSI-H | Host network IMSI |
| IN | Intelligent Network |
| IP | Internet Protocol |
| IR | IREG |
| IREG | International Roaming Expert Group |
| ISC | International Service Carrier |
| ISD | MAP Insert Subscriber Data |
| ISTP | International STP |
| ISUP | ISDN User Part |
| LUP | MAP Location Update |
| MAP | Mobile Application Part |
| MCC | Mobile Country Code |
| MMS | Multimedia Message Service |
| MNC | Mobile Network Code |
| MO | Mobile Originated |
| MSC | Mobile Switching Center |
| MSISDN | Mobile Station International Subscriber Directory Number |
| MSRN | Mobile Station Roaming Number |
| MT | Mobile Terminated |
| MTP | Message Transfer Part |
| NDC | National Dialing Code |
| OC | Open Connectivity |
| ODB | Operator Determined Barring |
| PRD | Permanent Reference Document |
| PRN | MAP Provide Roaming Number |
| RNA | Roaming Not Allowed |
| RR | Roaming Restricted due to unsupported feature |
| RRB | Request Report Basic call state model |
| SCCP | Signaling Connection Control part |
| SCP | Service Control Point |
| SGSN | Serving GPRS Support Node |
| SIM | Subscriber Identity Module |
| SMS | Short Message Service |
| SMSC | Short Message Service Center |
| SMSC-C | Client network SMSC |
| SoR | Steering of Roaming |
| SPRS | Signal Packet Relay System |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switching Point |
| STP | Signaling Transfer Point |
| STP-C | Client network STP |
| STP-H | Host network STP |
| TADIG | Transfer Accounting Data International Group |
| TAP | Transfer Accounting Procedure |
| TCAP | Transaction Capabilities Application Part |
| TT | Translation Type |
| VLR | Visitor Location Register |
| VMSC | Visited MSC |
| UDTS | UnitDaTa Service |
| VPMN | Visited Public Mobile Network |

I claim:

1. A method for facilitating exchange of a signaling message, the method comprising:
    identifying, via a Signal Packet Relay System (SPRS) router associated with a client network, at least one parameter in the signaling message received at the SPRS router so as to determine from the at least one parameter one or more roaming agreements between the client network and a Host Supported Roaming Partner (HSRP) network, and so as to allow exchange of the signaling message between the client network and the HSRP network;
    when the SPRS router determines absence of any of the one or more roaming agreements, facilitating, via the SPRS router, exchange of the signaling message between the client network and the HSRP network via one or more SPRS hubs;
    when the SPRS router determines presence of at least one of the one or more roaming agreements, facilitating, via the SPRS router, direct exchange of the signaling message between the client network and the HSRP network;
    detecting, via at least one of the one or more SPRS hubs or the SPRS router, a registration attempt of an inbound roamer at the client network incoming via the HSRP network;
    holding, at the SPRS router, a registration message received from the inbound roamer;
    encapsulating the registration message and transmitting the encapsulated registration message to the HSRP network, either directly or via the one or more SPRS hubs;
    upon receiving an indication that the inbound roamer is not redirected away from the client network, transmitting, via the SPRS router, the held registration message or subsequent registration messages from the inbound roamer directly to the HSRP network; and
    upon receiving an indication that the inbound roamer is being redirected away from the client network, transmitting, via the SPRS router, the held registration message or the subsequent registration messages to the HSRP network via at least one of the one or more SPRS hubs.

2. The method of claim 1, wherein identifying the at least one parameter includes:
    detecting Signaling Connection Control part (SCCP) Called Party Address (CdPA), Sub System Number (SSN) and Transaction Capabilities Application Part (TCAP) content in the signaling message.

3. The method of claim 1, further comprising:
    encapsulating the signaling message, via the SPRS router, prior to transmitting the signaling messages to the one or more SPRS hubs.

4. The method of claim 3, further comprising:
    de-capsulating the encapsulated signaling message, via at least one of the one or more SPRS hubs, prior to relaying the encapsulated signaling message to the HSRP network.

5. The method of claim 1, further comprising:
allowing selective exchange of the signaling message between the client network and the HSRP network via at least one of the one or more SPRS hubs, wherein each of the one or more SPRS hubs selectively exchanges the signaling message based on blacklisting and white-listing criteria.

6. The method of claim 1, wherein a Signaling Transfer Point (STP) is associated with the client network, the STP being configured to route the signaling message to the SPRS router.

7. The method of claim 1, wherein an STP is associated with the client network, the STP being configured to route the signaling message to an International STP (ISTP) associated with an International Service Carrier (ISC), upon detecting a failure of the SPRS router.

8. The method of claim 1, further comprising:
detecting, via at least one of the one or more SPRS hubs, a registration attempt of an outbound roamer of the client network at the HSRP network, when the outbound roamer uses an International Mobile Subscriber Identity (IMSI) associated with the client network to register with the HSRP network.

9. The method of claim 8, wherein, when the signaling message is routed to a client network or at least one of the one or more SPRS hubs, the HSRP network performs one selected from the group consisting of:
configuring a Visitor Location Register (VLR) and a Serving General Packet Radio System Support Node (SGSN) to use IMSI analysis on a Mobile Country Code (MCC) or a Mobile Network Code (MNC) of the client network, both the VLR and the SGSN being associated with the HSRP network;
configuring an STP associated with the HSRP network or a third party network to examine Sub System Number (SSN) associated with both a Calling Party Address (CgPA) and a Called Party Address (CdPA) of the client network destined signaling messages; and
configuring the STP associated with the HSRP network to route the client network destined signaling message to the one or more SPRS hubs.

10. The method of claim 1, further comprising:
in order to facilitate an MT SMS to an outbound roamer of the client network, when a Short Message Service Center (SMSC) transmitting the MT Short Message Service (SMS) to the outbound roamer's MSISDN is a non-client network SMSC, modifying, via the SPRS router, one selected from a group consisting of:
when the outbound roamer uses a dual IMSI SIM to register with the HSRP network, an IMSI of the outbound roamer to the host IMSI of the outbound roamer; and
a Visited Mobile Switching Center (VMSC)/SGSN address to a VMSC/SGSN address associated with at least one of the one or more SPRS hubs.

11. The method of claim 1, further comprising:
holding, at the SPRS router, a registration message received from the inbound roamer when the SPRS router determines, from the registration message, presence of a roaming support at the client network and absence of at least one of the one or more roaming agreements between the client network and the HSRP network;
encapsulating the registration message and transmitting the encapsulated registration message to the HSRP network via at least one of the one or more SPRS hubs; and
receiving, at the SPRS router, an indication of whether the inbound roamer is a preferred roamer or a non-preferred roamer.

12. The method of claim 11, further comprising:
when the inbound roamer is indicated as the non-preferred roamer, performing one selected from a group consisting of:
transmitting an error message to the client network in response to the received registration message; and
transmitting a subsequent registration message from the inbound roamer directly to the HSRP network.

13. The method of claim 11, further comprising:
when the inbound roamer is indicated as the preferred roamer, performing one selected from a group consisting of:
transmitting an error message to the client network in response to the received registration message; and
transmitting a subsequent registration message from the inbound roamer to the HSRP network via the one or more SPRS hubs.

14. The method of claim 11, further comprising:
when the inbound roamer is indicated as the preferred roamer,
transmitting, via the SPRS router, the held registration message to the HSRP network via at least one of the one or more SPRS hubs.

15. The method of claim 11 further comprising:
when the inbound roamer is indicated as the non-preferred roamer, transmitting, via the SPRS router, the held registration directly to the HSRP network.

16. The method of claim 1, wherein an STP associated with the client network is configured to route the signaling message, destined for the HSRP network, to the SPRS router when the HSRP network attempts to redirect traffic of the inbound roamer away from the client network.

17. The method of claim 1, wherein the SPRS router transmits the subsequent registration messages to at least one of the one or more SPRS hubs until a successful registration is detected by the SPRS router or all of the one or more SPRS hubs fail to complete the inbound roamer's registration with the client network.

18. The method of claim 1, further comprising:
transmitting the inbound roamer's registration message to the HSRP network either directly or via at least one of the one or more SPRS hubs;
determining whether the inbound roamer is a prepaid roamer or a postpaid roamer;
when the inbound roamer is determined to be a prepaid roamer, transmitting the registration message or a subsequent prepaid roamer registration message from the inbound roamer to the HSRP network via at least one of the one or more SPRS hubs; and
when the inbound roamer is determined to be a postpaid roamer, transmitting the registration message or a subsequent postpaid roamer registration message to the HSRP network.

19. The method of claim 1, wherein the SPRS router routes the signaling message to the HSRP network via at least one of the one or more SPRS hubs in a format that is recognizable by the HSRP network.

20. The method of claim 1, wherein at least one of the one or more SPRS hubs support at least one of the one or more roaming agreements, the at least one of the one or more roaming agreements being among a plurality of client networks and a plurality of HSRP networks.

21. The method of claim 20, further comprising:
storing at the one or more SPRS hubs at least one selected from a group consisting of
a blacklist or a white-list of the plurality of the HSRP networks; and identity mappings associated with each of the plurality of client networks.

22. The method of claim 1, wherein the client network maintains a plurality of roaming agreements with a plurality of host networks corresponding to each of the one or more SPRS hubs, and wherein the SPRS router stores information related to each of the one or more roaming agreements between the client network and the plurality of HSRP networks and each of the plurality of roaming agreements with the plurality of the host networks corresponding to each of the one or more SPRS hubs.

23. A method for facilitating exchange of a signaling message, the method comprising:
identifying, via an SPRS router associated with a client network, one or more parameters in the signaling message received at the SPRS router so as to determine from the identified parameters one or more roaming agreements with the client network to allow exchange of the signaling message from the client network;
when the SPRS router determines absence of any of the one or more roaming agreements, facilitating, via the SPRS router, indirect exchange of the signaling message from the client network;
when the SPRS router determines presence of at least one of the one or more roaming agreements, facilitating, via the SPRS router, direct exchange of the signaling message from the client network;
detecting, via at least one of the one or more SPRS hubs or the SPRS router, a registration attempt of an inbound roamer at the client network incoming via the HSRP network;
holding, at the SPRS router, a registration message received from the inbound roamer;
encapsulating the registration message and transmitting the encapsulated registration message to the HSRP network, either directly or via the one or more SPRS hubs;
upon receiving an indication that the inbound roamer is not redirected away from the client network, transmitting, via the SPRS router, the held registration message or subsequent registration messages from the inbound roamer directly to the HSRP network; and
upon receiving an indication that the inbound roamer is being redirected away from the client network, transmitting, via the SPRS router, the held registration message or the subsequent registration messages to the HSRP network via at least one of the one or more SPRS hubs.

24. A system for facilitating exchange of a signaling message, the system comprising:
a client network;
an HSRP network that is accessible via the client network;
one or more SPRS hubs accessible via the client network; and
an SPRS router associated with the client network for identifying at least one parameter in the signaling message received at the SPRS router so as to determine from the at least one parameter one or more roaming agreements between the client network and the HSRP network and so as to allow exchange of the signaling message between the client network and the HSRP network;
wherein, when the SPRS router determines absence of at least one of the one or more roaming agreements, the SPRS router facilitates exchange of the signaling message between the client network and the HSRP network via at least one of the one or more SPRS hubs; and
wherein, when the SPRS router determines presence of at least one of the one or more roaming agreements, the SPRS router facilitates direct exchange of the signaling message between the client network and the HSRP network,
wherein when at least one of the one or more SPRS hubs or the SPRS router detects a registration attempt of an inbound roamer at the client network incoming via the HSRP network, the SPRS router holds a registration message received from the inbound roamer; the registration message is encapsulated and the encapsulated registration message is transmitted to the HSRP network, either directly or via the one or more SPRS hubs; upon receiving an indication that the inbound roamer is not redirected away from the client network, the held registration message or subsequent registration messages from the inbound roamer is transmitted, via the SPRS router, directly to the HSRP network; and upon receiving an indication that the inbound roamer is being redirected away from the client network, the held registration message or the subsequent registration messages is transmitted, via the SPRS router, to the HSRP network via at least one of the one or more SPRS hubs.

25. The system of claim 24, wherein at least one of the SPRS router or the one or more SPRS hubs is associated with an STP of the client network or an STP of a host network.

26. The system of claim 24, wherein a host network operator or an Open Connectivity (OC) hub deploys at least one of the one or more SPRS hubs.

27. The system of claim 24, wherein an OC hub deploys at least one of the one or more SPRS hubs, and wherein the deployed at least one of the one or more SPRS hubs is integrated with the SPRS router.

28. The system of claim 24, wherein at least one of the one or more SPRS hubs communicates with the SPRS router using one selected from a group consisting of Signaling System #7 (SS7) protocol, Internet Protocol (IP) and Signalling Transport (SIGTRAN) protocol.

29. A computer program product comprising a non-transitory computer usable medium including a computer usable program code for facilitating exchange of a signaling message, the computer program product comprising:
computer usable program code for identifying, via an SPRS router associated with a client network, at least one parameter in the signaling message received at the SPRS router so as to determine from the at least one parameter one or more roaming agreements between the client network and an HSRP network, and so as to allow exchange of the signaling messages between the client network and the HSRP network;
computer usable program code for, when the SPRS router determines absence of any of the one or more roaming agreements, facilitating, via the SPRS router, exchange of the signaling messages between the client network and the HSRP network via one or more SPRS hubs;
computer usable program code for, when the SPRS router determines presence of at least one of the one or more roaming agreements, facilitating, via the SPRS router, direct exchange of the signaling messages between the client network and the HSRP network;
computer usable program code for detecting, via at least one of the one or more SPRS hubs or the SPRS router, a registration attempt of an inbound roamer at the client network incoming via the HSRP network;
computer usable program code for holding, at the SPRS router, a registration message received from the inbound roamer;
computer usable program code for encapsulating the registration message and transmitting the encapsulated registration message to the HSRP network, either directly or via the one or more SPRS hubs;

computer usable program code for upon receiving an indication that the inbound roamer is not redirected away from the client network, transmitting, via the SPRS router, the held registration message or subsequent registration messages from the inbound roamer directly to the HSRP network; and computer usable program code for upon receiving an indication that the inbound roamer is being redirected away from the client network, transmitting, via the SPRS router, the held registration message or the subsequent registration messages to the HSRP network via at least one of the one or more SPRS hubs.

30. The method of claim 1, further comprising:
performing an advanced service.

31. The method of claim 23, further comprising:
performing an advanced service.

32. The system of claim 24, wherein the client network performs an advanced service.

33. The system of claim 24, wherein at least one of the one or more SPRS hubs performs an advanced service.

\* \* \* \* \*